United States Patent
Zhang et al.

(10) Patent No.: US 11,902,883 B2
(45) Date of Patent: Feb. 13, 2024

(54) METHOD AND DEVICE IN UE AND BASE STATION USED FOR WIRELESS COMMUNICATION

(71) Applicants: Xiaobo Zhang, Shanghai (CN); Lin Yang, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 10 days.

(21) Appl. No.: 17/860,113

(22) Filed: Jul. 8, 2022

(65) Prior Publication Data
US 2022/0353792 A1    Nov. 3, 2022

Related U.S. Application Data

(63) Continuation of application No. 16/395,274, filed on Apr. 26, 2019, now Pat. No. 11,425,631.

(30) Foreign Application Priority Data

Apr. 27, 2018  (CN) .......................... 201810390476.9

(51) Int. Cl.
*H04L 12/00*    (2006.01)
*H04W 48/12*    (2009.01)
(Continued)

(52) U.S. Cl.
CPC .......... *H04W 48/12* (2013.01); *H04L 5/0007* (2013.01); *H04L 5/0046* (2013.01); *H04L 27/2657* (2013.01); *H04L 27/2666* (2013.01)

(58) Field of Classification Search
None
See application file for complete search history.

(56) References Cited

U.S. PATENT DOCUMENTS

2015/0351115 A1    12/2015 Jeon et al.
2019/0230706 A1*   7/2019 Li .......................... H04W 72/12
(Continued)

FOREIGN PATENT DOCUMENTS

| CN | 106664673 A | 5/2017 |
| CN | 107734682 A | 2/2018 |

OTHER PUBLICATIONS

CN Search Report in application No. 201810390476.9 dated Feb. 21, 2020.

(Continued)

*Primary Examiner* — Noel R Beharry
*Assistant Examiner* — Lionel Preval

(57) ABSTRACT

The present disclosure provides a method and a device in a User Equipment (UE) and a base station for wireless communication. The UE receives first information, the first information is used to indicate K sub-band(s); the UE performs first access detection, or performs second access detection; transmits or drops transmitting a first radio signal in the first sub-band. If the first sub-band is one of K sub-band(s) and time domain resources occupied by the first radio signal belong to a first time window, the first access detection is performed, the first access detection is used to determine whether the first radio signal is transmitted in the first sub-band; the second access detection is used to determine whether the first radio signal is transmitted in the first sub-band; the detection time of the first access detection is less than that of the second access detection.

16 Claims, 16 Drawing Sheets

(51) Int. Cl.
H04L 5/00 (2006.01)
H04L 27/26 (2006.01)

(56) References Cited

U.S. PATENT DOCUMENTS

2019/0253200 A1* 8/2019 Salem .................. H04W 16/14
2021/0058964 A1* 2/2021 Hooli ................. H04W 74/008

OTHER PUBLICATIONS

CN First Office Action in Application No. 201810390476.9 dated Feb. 26, 2020.
CN Grant Notice in Application No. 201810390476.9 dated Mar. 20, 2020.
«3GPP TSG RAN WG1 Meeting#90bis» Ericsson R1-1718720; Remaining details on NR-RACH capacity.

* cited by examiner

METHOD AND DEVICE IN UE AND BASE STATION USED FOR WIRELESS COMMUNICATION

CROSS-REFERENCE TO RELATED APPLICATION

This application claims is the continuation of the U.S. patent application Ser. No. 16/395,274, filed on Apr. 26, 2019, which claims the priority benefit of Chinese Patent Application Serial Number 201810390476.9, filed on Apr. 27, 2018, the full disclosure of which is incorporated herein by reference.

BACKGROUND

Technical Field

The present disclosure relates to transmission methods and devices in wireless communication systems, and in particular to a communication method and a communication device supporting data transmission on unlicensed spectrum.

Related Art

In traditional $3^{rd}$ Generation Partner Project (3GPP) Long-term Evolution (LTE) systems, data transmission can only be performed on licensed spectrum, however, as business enlarges rapidly, especially in some cities and regions, licensed spectrum may hardly meet the requirements of increasing business. Therefore, communication on unlicensed spectrum in Release 13 and Release 14 is introduced into cellular systems and used for downlink and uplink data transmissions. In order to guarantee the compatibility with other access technologies on unlicensed spectrum, Listen Before Talk (LBT) is adopted by Licensed Assisted Access (LAA) of LTE to avoid interference caused by multiple transmitters occupying same frequency resources simultaneously. LBT types adopted by LTE uplink comprise Cat 2 and Cat 4, LBT Cat 2 includes initial Clear Channel Assessment (CCA) and only initial CCA within backoff duration, while LBT Cat 4 includes both initial CCA and backoff duration.

In 5G New Radio (NR) Access Technology Phase 1 system, considering that reception bandwidth of a terminal is limited, among other reasons, the concept of Bandwidth Part (BWP) is introduced to support multiple subcarrier spacings under one system bandwidth, which means when a cell has a Component Carrier (CC) with larger bandwidth, a base station can divide the larger CC into multiple BWPs to adapt to User Equipment (UE) with varying capabilities of reception bandwidth and transmission bandwidth. The BWP bandwidth can be configured in a flexible manner. When a UE with smaller bandwidth capability is in communication with a cell, the UE can only perform downlink reception or uplink transmission on BWPs with smaller bandwidth. When a UE with larger bandwidth capability is in communication with a cell, the UE can perform downlink reception or uplink transmission on BWPs with larger bandwidth. At present, as access technology relevant to unlicensed spectrum in 5G NR is under discussion, a relationship between LBT bandwidth and CC or between LBT bandwidth and BWP becomes a vital problem needed to be solved.

SUMMARY

The inventor has found through researches that in uplink transmissions on unlicensed spectrum in NR systems, how to increase chance of channel access and efficiency of realizing unlicensed spectrum resources shared by multiple transmitting nodes has become a significant problem that needs solving.

In view of the above problem, the present disclosure provides a solution. It should be noted that the embodiments of the present disclosure and the characteristics in the embodiments may be mutually combined if no conflict is incurred.

The present disclosure provides a method in a UE for wireless communication, comprising:
  receiving first information, the first information is used for indicating K frequency sub-band(s), K is a positive integer;
  performing a first access detection, or performing a second access detection; and
  transmitting a first radio signal in a first frequency sub-band, or dropping transmission of the first radio signal in the first frequency sub-band;
  wherein the first frequency sub-band comprises frequency domain resources occupied by the first radio signal; if the first frequency sub-band belongs to the K frequency sub-band(s) and time domain resources occupied by the first radio signal belong to a first time window, the first access detection is performed, the first access detection is used for determining whether the first radio signal is transmitted in the first frequency sub-band; otherwise, the second access detection is performed, the second access detection is used for determining whether the first radio signal is transmitted in the first frequency sub-band; detection time for the first access detection is less than that for the second access detection.

In one embodiment, a problem needed to be solved in the present disclosure is: when bandwidth of CC or BWP is larger, if LBT bandwidth is the same as bandwidth of CC or BWP, a larger LBT bandwidth may cause lower chance of channel access. To increase chance of channel access and more efficiently realize sharing of unlicensed spectrum resources by multiple transmitting nodes, choosing narrowband LBT (i.e., bandwidth is smaller than CC or BWP, or LBT bandwidth is smaller than transmission bandwidth of a radio signal) will increase the chance of channel access when meeting the condition that LBT bandwidth is in conformity with regulations (for example, 20 MHz for a carrier frequency of 5 GHz, 1 GHz for a carrier frequency of 60 GHz). Therefore, uplink transmission under narrowband LBT is an urgent problem to be solved.

In one embodiment, the essence of the above method lies in that K frequency sub-band(s) is(are) K BWP(s) of M BWP(s) comprised in a CC, a base station performs narrowband LBT on M BWP(s) respectively and then determines that only channels on the K BWP(s) of M BWP(s) are idle, and a base station has already occupied the K BWP(s) when transmitting first information; a first frequency sub-band is a BWP of M BWP(s), a UE determines types of LBT, for example Cat 2 and Cat 4, based on whether a first frequency sub-band belongs to the K BWP(s), namely, whether a first frequency sub-band is occupied by a base station. An advantage of the above method is that narrowband LBT effectively increases chance of channel access.

In one embodiment, the essence of the above method lies in that K frequency sub-band(s) is(are) K sub-band(s) of M sub-band(s) comprised in a BWP, a base station performs narrowband LBT on M sub-band(s) respectively and then determines that only channels on the K sub-band(s) of M sub-band(s) are idle, and a base station has already occupied the K sub-band(s) when transmitting first information; a first frequency sub-band is a sub-band of M sub-band(s), a UE determines types of LBT, for example Cat 2 and Cat 4, based on whether a first frequency sub-band belongs to the K sub-band(s), namely, whether a first frequency sub-band is occupied by a base station. An advantage of the above method is that narrowband LBT effectively increases chance of channel access.

According to one aspect of the present disclosure, the above method is characterized in that wherein the first access detection comprises performing Q energy detection(s) respectively in Q time sub-pool(s) of a first frequency band, and acquiring Q detection value(s), end time of the Q time sub-pool(s) is not later than start time for transmission of the first radio signal; the first frequency band comprises the first frequency sub-band; if each one of Q1 detection value(s) of the Q detection value(s) is lower than a first reference threshold, the first radio signal is transmitted in the first frequency sub-band; otherwise, transmission of the first radio signal is dropped in the first frequency sub-band; Q is a positive integer, Q1 is a positive integer not greater than the Q.

According to one aspect of the present disclosure, the above method is characterized in that the second access detection comprises performing P energy detection(s) respectively in P time sub-pool(s) of a second frequency band, and acquiring P detection value(s), end time of the P time sub-pool(s) is not later than start time for transmission of the first radio signal; the second frequency band comprises the first frequency sub-band; if P1 detection value(s) of the P detection value(s) is lower than the first reference threshold, the first radio signal is transmitted in the first frequency sub-band; otherwise, transmission of the first radio signal is dropped in the first frequency sub-band; P is a positive integer, P1 is a positive integer not greater than the P, the P1 is greater than the Q1.

According to one aspect of the present disclosure, the above method comprises:
  receiving second information;
  wherein the second information is used for determining at least one of the frequency domain resources occupied by the first radio signal and the time domain resources occupied by the first radio signal.

According to one aspect of the present disclosure, the above method is characterized in that M frequency sub-band(s) comprises(comprise) the K frequency sub-band(s), the M frequency sub-band(s) is(are) pre-defined or configurable, M is a positive integer not less than the K.

According to one aspect of the present disclosure, the above method comprises:
  transmitting a second radio signal in a second frequency sub-band, or dropping transmission of a second radio signal in a second frequency sub-band;
  wherein the second frequency sub-band comprises frequency domain resources occupied by the second radio signal, start time for transmission of the first radio signal and that of the second radio signal are the same, the first frequency sub-band and the second frequency sub-band are orthogonal in frequency domain.

In one embodiment, the essence of the above method lies in that a first frequency sub-band and a second frequency sub-band are two sub-bands of M sub-bands, target radio signals comprise a first radio signal and a second radio signal, the first radio signal and the second radio signal are part radio signals of target radio signals in a first frequency sub-band and in a second frequency sub-band respectively, second information indicates time domain resources and frequency domain resources occupied by target radio signals. A UE may employ one same LBT or different kinds of LBT to determine whether a first radio signal can be transmitted on a first frequency sub-band and whether a second radio signal can be transmitted on a second frequency sub-band. An advantage of the above method is that narrowband LBT can be performed on different sub-bands respectively, so that radio signals can be transmitted as many as possible, thereby effectively improving utilization ratio of unlicensed spectrum resources and spectral efficiency of a system.

According to one aspect of the present disclosure, the above method comprises:
  performing a third access detection, or performing a fourth access detection;
  wherein if the second frequency sub-band belongs to the K frequency sub-band(s) and time domain resources occupied by the second radio signal belong to a second time window, the third access detection is performed, the third access detection is used for determining whether the second radio signal is transmitted in the second frequency sub-band; otherwise, the fourth access detection is performed, the fourth access detection is used for determining whether the second radio signal is transmitted in the second frequency sub-band; detection time for the third access detection is less than that for the fourth access detection.

According to one aspect of the present disclosure, the above method is characterized in that the first access detection or the second access detection is further used for determining whether the second radio signal is transmitted in the second frequency sub-band, the first frequency band comprises the first frequency sub-band and the second frequency sub-band, the second frequency band comprises the first frequency sub-band and the second frequency sub-band.

The present disclosure provides a method in a base station for wireless communication, comprising:
  transmitting first information, the first information is used for indicating K frequency sub-band(s), K is a positive integer; and
  monitoring in a first frequency sub-band whether a first radio signal is transmitted;
  wherein the first frequency sub-band comprises frequency domain resources occupied by the first radio signal; transmitter of the first radio signal performs a first access detection or a second access detection; if the first frequency sub-band belongs to the K frequency sub-band(s) and time domain resources occupied by the first radio signal belong to a first time window, the first access detection is performed, the first access detection is used for determining whether the first radio signal is transmitted in the first frequency sub-band; otherwise, the second access detection is performed, the second access detection is used for determining whether the first radio signal is transmitted in the first frequency sub-band; detection time for the first access detection is less than that for the second access detection.

According to one aspect of the present disclosure, the above method is characterized in that the first access detection comprises performing Q energy detection(s) respectively in Q time sub-pool(s) of a first frequency band, and acquiring Q detection value(s), end time of the Q time sub-pool(s) is not later than start time for transmission of the first radio signal; the first frequency band comprises the first frequency sub-band; if each one of Q1 detection value(s) of the Q detection value(s) is lower than a first reference threshold, the first radio signal is transmitted in the first frequency sub-band; otherwise, transmission of the first radio signal is dropped in the first frequency sub-band; Q is a positive integer, Q1 is a positive integer not greater than the Q.

According to one aspect of the present disclosure, the above method is characterized in that the second access detection comprises performing P energy detection(s) respectively in P time sub-pool(s) of a second frequency band, and acquiring P detection value(s), end time of the P time sub-pool(s) is not later than start time for transmission of the first radio signal; the second frequency band comprises the first frequency sub-band; if P1 detection value(s) of the P detection value(s) is lower than the first reference threshold, the first radio signal is transmitted in the first frequency sub-band; otherwise, transmission of the first radio signal is dropped in the first frequency sub-band; P is a positive integer, P1 is a positive integer not greater than the P, the P1 is greater than the Q1.

According to one aspect of the present disclosure, the above method comprises:
transmitting second information;
wherein the second information is used for determining at least one of the frequency domain resources occupied by the first radio signal and the time domain resources occupied by the first radio signal.

According to one aspect of the present disclosure, the above method is characterized in that M frequency sub-band(s) comprises(comprise) the K frequency sub-band(s), the M frequency sub-band(s) is(are) pre-defined or configurable, M is a positive integer not less than the K.

According to one aspect of the present disclosure, the above method comprises:
monitoring in a second frequency sub-band whether a second radio signal is transmitted;
wherein the second frequency sub-band comprises frequency domain resources occupied by the second radio signal, start time for transmission of the first radio signal and that of the second radio signal are the same, the first frequency sub-band and the second frequency sub-band are orthogonal in frequency domain.

According to one aspect of the present disclosure, the above method is characterized in that transmitter of the second radio signal performs a third access detection, or performs a fourth access detection; if the second frequency sub-band belongs to the K frequency sub-band(s) and time domain resources occupied by the second radio signal belong to a second time window, the third access detection is performed, the third access detection is used for determining whether the second radio signal is transmitted in the second frequency sub-band; otherwise, the fourth access detection is performed, the fourth access detection is used for determining whether the second radio signal is transmitted in the second frequency sub-band; detection time for the third access detection is less than that for the fourth access detection.

According to one aspect of the present disclosure, the above method is characterized in that wherein the first access detection or the second access detection is further used for determining whether the second radio signal is transmitted in the second frequency sub-band, the first frequency band comprises the first frequency sub-band and the second frequency sub-band, the second frequency band comprises the first frequency sub-band and the second frequency sub-band.

The present disclosure provides a UE for wireless communication, comprising:

a first receiver, receiving first information, the first information is used for indicating K frequency sub-band(s), K is a positive integer; performing a first access detection, or performing a second access detection; and
a first transmitter, transmitting a first radio signal in a first frequency sub-band, or dropping transmission of the first radio signal in the first frequency sub-band;
wherein the first frequency sub-band comprises frequency domain resources occupied by the first radio signal; if the first frequency sub-band belongs to the K frequency sub-band(s) and time domain resources occupied by the first radio signal belong to a first time window, the first access detection is performed, the first access detection is used for determining whether the first radio signal is transmitted in the first frequency sub-band; otherwise, the second access detection is performed, the second access detection is used for determining whether the first radio signal is transmitted in the first frequency sub-band; detection time for the first access detection is less than that of the second access detection.

In one embodiment, the above UE is characterized in that the first access detection comprises performing Q energy detection(s) respectively in Q time sub-pool(s) of a first frequency band, and acquiring Q detection value(s), end time of the Q time sub-pool(s) is not later than start time for transmission of the first radio signal; the first frequency band comprises the first frequency sub-band; if each one of Q1 detection value(s) of the Q detection value(s) is lower than a first reference threshold, the first radio signal is transmitted in the first frequency sub-band; otherwise, transmission of the first radio signal is dropped in the first frequency sub-band; Q is a positive integer, Q1 is a positive integer not greater than the Q;

In one embodiment, the above UE is characterized in that the second access detection comprises performing P energy detection(s) respectively in P time sub-pool(s) of a second frequency band, and acquiring P detection value(s), end time of the P time sub-pool(s) is not later than start time for transmission of the first radio signal; the second frequency band comprises the first frequency sub-band; if P1 detection value(s) of the P detection value(s) is lower than the first reference threshold, the first radio signal is transmitted in the first frequency sub-band; otherwise, transmission of the first radio signal is dropped in the first frequency sub-band; P is a positive integer, P1 is a positive integer not greater than the P, the P1 is greater than the Q1.

In one embodiment, the above UE is characterized in that the first receiver further receives second information; wherein the second information is used for determining at least one of the frequency domain resources occupied by the first radio signal and time domain resources occupied by the first radio signal.

In one embodiment, the above UE is characterized in that the first transmitter further transmits a second radio signal in a second frequency sub-band, or drops transmission of the second radio signal in the second frequency sub-band; wherein the second frequency sub-band comprises frequency domain resources occupied by the second radio signal, start time for transmission of the first radio signal and that of the second radio signal are the same, the first frequency sub-band and the second frequency sub-band are orthogonal in frequency domain.

In one embodiment, the above UE is characterized in that the first receiver further performs a third access detection, or performs a fourth access detection; wherein if the second frequency sub-band belongs to the K frequency sub-band(s) and time domain resources occupied by the second radio signal belong to a second time window, the third access detection is performed, the third access detection is used for determining whether the second radio signal is transmitted in the second frequency sub-band; otherwise, the fourth access detection is performed, the fourth access detection is used for determining whether the second radio signal is transmitted in the second frequency sub-band; detection time for the third access detection is less than that for the fourth access detection.

In one embodiment, the above UE is characterized in that the first access detection or the second access detection is further used for determining whether the second radio signal is transmitted in the second frequency sub-band, the first frequency band comprises the first frequency sub-band and the second frequency sub-band, the second frequency band comprises the first frequency sub-band and the second frequency sub-band.

The present disclosure provides a base station for wireless communication, comprising:

a second transmitter, transmitting first information, the first information is used for indicating K frequency sub-band(s), K is a positive integer; and a second receiver, monitoring in a first frequency sub-band whether a first radio signal is transmitted;

wherein the first frequency sub-band comprises frequency domain resources occupied by the first radio signal; transmitter of the first radio signal performs a first access detection or a second access detection; if the first frequency sub-band belongs to the K frequency sub-band(s) and time domain resources occupied by the first radio signal belong to a first time window, the first access detection is performed, the first access detection is used for determining whether the first radio signal is transmitted in the first frequency sub-band; otherwise, the second access detection is performed, the second access detection is used for determining whether the first radio signal is transmitted in the first frequency sub-band; detection time for the first access detection is less than that for the second access detection.

In one embodiment, the above base station is characterized in that the first access detection comprises performing Q energy detection(s) respectively in Q time sub-pool(s) of a first frequency band, and acquiring Q detection value(s), end time of the Q time sub-pool(s) is not later than start time for transmission of the first radio signal; the first frequency band comprises the first frequency sub-band; if each one of Q1 detection value(s) of the Q detection value(s) is lower than a first reference threshold, the first radio signal is transmitted in the first frequency sub-band; otherwise, transmission of the first radio signal is dropped in the first frequency sub-band; Q is a positive integer, Q1 is a positive integer not greater than the Q;

In one embodiment, the above base station is characterized in that the second access detection comprises performing P energy detection(s) respectively in P time sub-pool(s) of a second frequency band, and acquiring P detection value(s), end time of the P time sub-pool(s) is not later than start time for transmission of the first radio signal; the second frequency band comprises the first frequency sub-band; if P1 detection value(s) of the P detection value(s) is lower than the first reference threshold, the first radio signal is transmitted in the first frequency sub-band; otherwise, transmission of the first radio signal is dropped in the first frequency sub-band; P is a positive integer, P1 is a positive integer not greater than the P, the P1 is greater than the Q1.

In one embodiment, the above base station is characterized in that the second transmitter further transmits second information; wherein the second information is used for determining at least one of the frequency domain resources occupied by the first radio signal and the time domain resources occupied by the first radio signal.

In one embodiment, the above base station is characterized in that M frequency sub-band(s) comprises(comprise) the K frequency sub-band(s), the M frequency sub-band(s) is(are) pre-defined or configurable, M is a positive integer not less than K.

In one embodiment, the above base station is characterized in that the second receiver further monitors in a second frequency sub-band whether a second radio signal is transmitted; wherein the second frequency sub-band comprises frequency domain resources occupied by the second radio signal, start time for transmission of the first radio signal and that of the second radio signal are the same, the first frequency sub-band and the second frequency sub-band are orthogonal in frequency domain.

In one embodiment, the above base station is characterized in that a transmitter of the second radio signal performs a third access detection, or performs a fourth access detection; if the second frequency sub-band belongs to the K frequency sub-band(s) and time domain resources occupied by the second radio signal belong to a second time window, the third access detection is performed, the third access detection is used for determining whether the second radio signal is transmitted in the second frequency sub-band; otherwise, the fourth access detection is performed, the fourth access detection is used for determining whether the second radio signal is transmitted in the second frequency sub-band; detection time for the third access detection is less than that for the fourth access detection.

In one embodiment, the above base station is characterized in that the first access detection or the second access detection is further used for determining whether the second radio signal is transmitted in the second frequency sub-band, the first frequency band comprises the first frequency sub-band and the second frequency sub-band, the second frequency band comprises the first frequency sub-band and the second frequency sub-band.

In one embodiment, the present disclosure has the following advantages over conventional schemes:

A CC comprises M BWP(s), a base station performs narrowband LBT on M BWP(s) respectively and then determines that only channels on K BWP(s) of M BWP(s) are idle, a base station occupies the K BWP(s); a UE determines types of LBT, for example Cat 2 and Cat 4, based on whether frequency domain resources occupied by radio signals to be transmitted belong to the K BWP(s). Application of narrowband LBT can effectively increase chance of channel access.

A BWP comprises M sub-band(s), a base station performs narrowband LBT on M sub-band(s) respectively and then determines that only channels on K sub-band(s) of M sub-band(s) are idle, a base station occupies the K sub-band(s); a UE determines types of LBT, for example Cat 2 and Cat 4, based on whether frequency domain resources occupied by radio signals to be transmitted belong to the K sub-band(s). application of narrowband LBT can effectively increase chance of channel access.

Radio signals to be transmitted comprise multiple radio sub-signals, frequency domain resources of the multiple radio sub-signals belong to different BWPs or sub-bands of M BWPs or M sub-bands, a UE may employ one same LBT or different kinds of LBT to determine which of the multiple radio sub-signals can be transmitted on corresponding BWPs or sub-bands. The above method is advantageous in that narrowband LBT can be performed on different sub-bands, as a result, radio signals may be transmitted as many as possible, thus significantly enhancing utilization ratio of unlicensed spectrum resources, and further improving spectral efficiency of a system.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
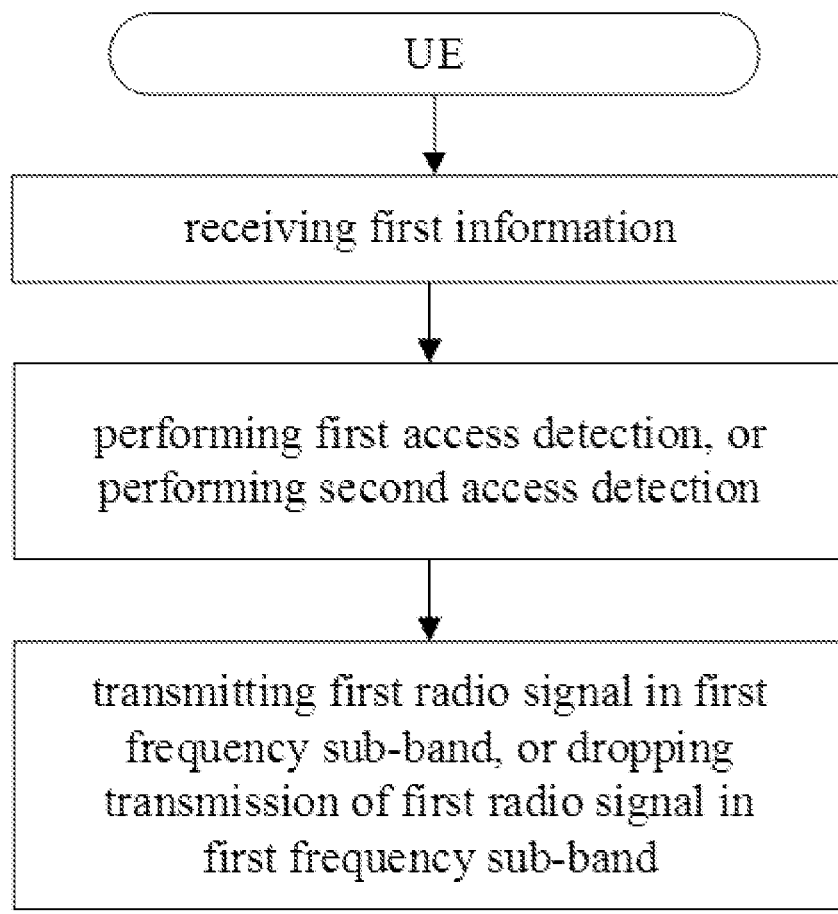
FIG. 1 illustrates a flowchart of first information, a first access detection, a second access detection and a first radio signal according to one embodiment of the present disclosure.

Embodiment 1 illustrates a flowchart of first information, a first access detection, a second access detection and a first radio signal, as shown in FIG. 1.

In Embodiment 1, the UE in present disclosure receives first information, the first information being used for indicating K frequency sub-band(s), K is a positive integer; performs a first access detection, or performs a second access detection; and transmits a first radio signal in a first frequency sub-band, or drops transmission of the first radio signal in the first frequency sub-band; wherein the first frequency sub-band comprises frequency domain resources occupied by the first radio signal; if the first frequency sub-band belongs to the K frequency sub-band(s) and time domain resources occupied by the first radio signal belong to a first time window, the first access detection is performed, the first access detection is used for determining whether the first radio signal is transmitted in the first frequency sub-band; otherwise, the second access detection is performed, the second access detection is used for determining whether the first radio signal is transmitted in the first frequency sub-band; detection time for the first access detection is less than that for the second access detection.

In one embodiment, the first information is dynamically configured.

In one embodiment, the first information is carried by a physical layer signaling.

In one embodiment, the first information is transmitted on a frequency band deployed on unlicensed spectrum.

In one embodiment, the first information is transmitted on a frequency band deployed on licensed spectrum.

In one embodiment, the first information is transmitted on the first frequency sub-band.

In one embodiment, the first information is transmitted on a sub-band other than the first frequency sub-band.

In one embodiment, the first information is transmitted on a frequency band deployed on licensed spectrum other than the first frequency sub-band.

In one embodiment, the first information is transmitted on a frequency band deployed on unlicensed spectrum other than the first frequency sub-band.

In one embodiment, the first information is transmitted on a sub-band of the K frequency sub-band(s).

In one embodiment, the first information is transmitted on a sub-band other than the K frequency sub-band(s).

In one embodiment, the first information is transmitted on a frequency band deployed on licensed spectrum other than the K frequency sub-band(s).

In one embodiment, the first information is transmitted on a frequency band deployed on unlicensed spectrum other than the K frequency sub-band(s).

In one embodiment, the first information belongs to Downlink Control Information (DCI).

In one embodiment, the first information belongs to a field of a DCI signaling, the field comprises a positive integer number of bit(s).

In one embodiment, the first information is carried by a downlink physical layer control channel (i.e., a downlink channel that can only be used for carrying physical layer signaling).

In one subembodiment of the above embodiment, the downlink physical layer control channel is a Physical Downlink Control Channel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one subembodiment of the above embodiment, the downlink physical layer control channel is a Narrow Band PDCCH (NB-PDCCH).

In one embodiment, a signaling identifier for a signaling carrying the first information is a Component Carrier-Radio Network Temporary Identifier (CC-RNTI).

In one embodiment, the first information belongs to DCI identified by CC-RNTI.

In one embodiment, CC-RNTI is used for generating an RS sequence of DeModulation Reference Signals (DMRS) corresponding to a signaling carrying the first information.

In one embodiment, a Cyclic Redundancy Check (CRC) bit sequence for a signaling carrying the first information is scrambled by CC-RNTI.

In one embodiment, the first information belongs to DCI specific to a terminal group, the UE is a terminal of the terminal group.

In one embodiment, the first information belongs to DCI common to a cell.

In one embodiment, the first information is specific to a terminal group, the UE is a terminal of the terminal group.

In one embodiment, the first information is common to a cell.

In one embodiment, a signaling identifier for a signaling carrying the first information is a Cell-Radio Network Temporary Identifier (C-RNTI).

In one embodiment, the first information belongs to DCI identified by C-RNTI.

In one embodiment, C-RNTI is used for generating an RS sequence of DMRS corresponding to a signaling carrying the first information.

In one embodiment, a CRC bit sequence for a signaling carrying the first information is scrambled by C-RNTI.

In one embodiment, the first information belongs to UE-specific DCI.

In one embodiment, the first information is UE-specific.

In one embodiment, the first information explicitly indicates the K frequency sub-band(s).

In one embodiment, the first information implicitly indicates the K frequency sub-band(s).

In one embodiment, the first information is used for indicating the K frequency sub-band(s) of M frequency sub-band(s), the M frequency sub-band(s) comprises(comprise) any sub-band of the K frequency sub-band(s), M is a positive integer not less than K, the M frequency sub-band(s) is(are) pre-defined or configurable.

In one subembodiment of the above embodiment, the first information comprises M bit(s), the M bit(s) corresponds (correspond) to the M frequency sub-band(s) respectively; a given bit is any bit of the M bit(s), the given bit being equal to 1 is used for indicating that a frequency sub-band of the M frequency sub-band(s) corresponding to the given bit belongs to the K frequency sub-band(s), the given bit being equal to 0 is used for indicating that a frequency sub-band of the M frequency sub-band(s) corresponding to the given bit does not belong to the K frequency sub-band(s).

In one subembodiment of the above embodiment, the K is equal to 1, the first information comprises R bit(s), the R is a minimum positive integer not less than $\log_2 M$.

In one embodiment, the first information indicates first frequency domain resources, M frequency sub-band(s) comprises(comprise) K frequency sub-band(s), the K frequency sub-band(s) consists(consist) of all sub-band(s) belonging to the first frequency domain resources among the M frequency sub-band(s), M is a positive integer not less than K, the M frequency sub-band(s) is(are) pre-defined or configurable.

In one embodiment, any two of the K frequency sub-bands are orthogonal in frequency domain.

In one embodiment, any one frequency sub-band of the K frequency sub-band(s) is a Control Resource Set (CORESET).

In one embodiment, any one frequency sub-band of the K frequency sub-band(s) occupies a positive integer number of Physical Resource Block(s) (PRB(s)).

In one embodiment, any one frequency sub-band of the K frequency sub-band(s) occupies a positive integer number of subcarrier(s).

In one embodiment, any one frequency sub-band of the K frequency sub-band(s) belongs to unlicensed spectrum.

In one embodiment, any one frequency sub-band of the K frequency sub-band(s) is a Bandwidth Part (BWP).

In one embodiment, any one frequency sub-band of the K frequency sub-band(s) is a Component Carrier (CC).

In one embodiment, any one frequency sub-band of the K frequency sub-band(s) is a serving cell.

In one embodiment, any one frequency sub-band of the K frequency sub-band(s) is a sub-band.

In one embodiment, the K frequency sub-band(s) is(are) K sub-band(s) in a BWP respectively.

In one embodiment, the K frequency sub-band(s) is(are) K BWP(s) in a CC respectively.

In one embodiment, the K frequency sub-band(s) is(are) K sub-band(s) in a CC respectively.

In one embodiment, the K frequency sub-band(s) is(are) K CC(s) respectively.

In one embodiment, the first frequency sub-band is a CORESET.

In one embodiment, the first frequency sub-band occupies a positive integer number of Physical Resource Block(s) (PRB(s)).

In one embodiment, the first frequency sub-band occupies a positive integer number of subcarrier(s).

In one embodiment, the first frequency sub-band belongs to unlicensed spectrum.

In one embodiment, the first frequency sub-band is a BWP.

In one embodiment, the first frequency sub-band is a CC.

In one embodiment, the first frequency sub-band is a serving cell.

In one embodiment, the first frequency sub-band is a sub-band.

In one embodiment, the first frequency sub-band is a frequency sub-band of the K frequency sub-band(s).

In one embodiment, M frequency sub-band(s) comprises (comprise) the K frequency sub-band(s), the first frequency sub-band is a frequency sub-band of the M frequency sub-band(s).

In one embodiment, M frequency sub-bands comprise the K frequency sub-band(s), the first frequency sub-band is a frequency sub-band of the M frequency sub-bands that does not belong to the K frequency sub-band(s).

In one embodiment, the first frequency sub-band is not one of the K frequency sub-band(s).

In one embodiment, the first frequency sub-band and each of the K frequency sub-band(s) are orthogonal (not overlapping).

In one embodiment, duration time for the first time window in time domain is a Max Channel Occupy Time (MCOT) for the first frequency sub-band.

In one embodiment, the first time window comprises a positive integer number of consecutive time units.

In one embodiment, a transmitter of the first information cannot occupy the first frequency sub-band after the first time window.

In one embodiment, a transmitter of the first information needs to determine through energy detection that the first frequency sub-band is not occupied after the first time window.

In one embodiment, a transmitter of the first information needs to determine through access detection that the first frequency sub-band is not occupied after the first time window; the access detection is LBT, or the access detection is Clear Channel Assessment (CCA).

In one embodiment, a transmitter of the first information needs to determine through channel detection that the first frequency sub-band is not occupied after the first time window; the channel detection is LBT, or the channel detection is CCA.

In one embodiment, the time unit is a subframe.

In one embodiment, the time unit is a slot.

In one embodiment, the time unit is a mini-slot.

In one embodiment, duration time for the time unit in time domain is a positive integer number of multicarrier symbol(s).

In one embodiment, the first radio signal comprises at least one of data, control information and a reference signal.

In one embodiment, the first radio signal comprises data.

In one embodiment, the first radio signal comprises control information.

In one embodiment, the first radio signal comprises a reference signal.

In one embodiment, the first radio signal comprises data, control information and a reference signal.

In one embodiment, the first radio signal comprises data and control information.

In one embodiment, the first radio signal comprises control information and a reference signal.

In one embodiment, the first radio signal comprises data and a reference signal.

In one embodiment, the data comprised in the first radio signal is uplink data.

In one embodiment, the control information comprised in the first radio signal is Uplink Control Information (UCI).

In one embodiment, the control information comprised in the first radio signal comprises at least one of Hybrid Automatic Repeat reQuest (HARQ) feedback, a HARQ process number, an NDI, start time for transmission of the first radio signal, Channel State Information (CSI) and a Scheduling Request (SR).

In one subembodiment of the above embodiment, the CSI comprises at least one of Rank Indication (RI), a Precoding, Matrix Indicator (PMI), a Channel quality indicator (CQI), and a Csi-reference signal Resource Indicator (CRI).

In one subembodiment of the above embodiment, the HARQ process number is a number of HARQ process corresponding to the data comprised in the first radio signal.

In one subembodiment of the above embodiment, the NDI indicates whether the data comprised in the first radio signal is new data or retransmitted old data.

In one subembodiment of the above embodiment, the reference signal comprised in the first radio signal comprises one or more of DeModulation Reference Signal (DMRS), Sounding Reference Signal (SRS), and Phase error Tracking Reference Signals (PTRS).

In one embodiment, the reference signal comprised in the first radio signal includes SRS.

In one embodiment, the reference signal comprised in the first radio signal includes DMRS.

In one embodiment, the reference signal comprised in the first radio signal includes PTRS.

In one embodiment, the first radio signal is transmitted on an uplink random access channel.

In one subembodiment of the above embodiment, the uplink random access channel is a Physical Random Access Channel (PRACH).

In one embodiment, a transmission channel for the first radio signal is an Uplink Shared Channel (UL-SCH).

In one embodiment, the first radio signal is transmitted on an uplink physical layer data channel (i.e., an uplink channel that can be used for carrying physical layer data).

In one subembodiment of the above embodiment, the uplink physical layer data channel is a Physical Uplink Shared Channel (PUSCH).

In one subembodiment of the above embodiment, the uplink physical layer data channel is a shorten PUSCH (sPUSCH).

In one subembodiment of the above embodiment, the uplink physical layer data channel is a New Radio PUSCH (NR-PUSCH).

In one subembodiment of the above embodiment, the uplink physical layer data channel is a Narrow Band PUSCH (NB-PUSCH).

In one embodiment, the first radio signal is transmitted on an uplink physical layer control channel (i.e., an uplink channel that can only be used for carrying physical layer signaling).

In one subembodiment of the above embodiment, the uplink physical layer control channel is a Physical Uplink Control Channel (PUCCH).

In one subembodiment of the above embodiment, the uplink physical layer control channel is a short PUCCH (sPUCCH).

In one subembodiment of the above embodiment, the uplink physical layer control channel is a New Radio PUCCH (NR-PUCCH).

In one subembodiment of the above embodiment, the uplink physical layer control channel is a Narrow Band PUCCH (NB-PUCCH).

In one embodiment, if the first frequency sub-band is a frequency sub-band other than the K frequency sub-band(s), the second access detection is performed.

In one embodiment, if the first frequency sub-band belongs to the K sub-band(s), time domain resources occupied by the first radio signal comprise time domain resources other than the first time window, the second access detection is performed.

In one embodiment, the first access detection is used for determining whether radio signals can be transmitted on all or part of frequency domain resources in the first frequency sub-band.

In one embodiment, the second access detection is used for determining whether radio signals can be transmitted on all or part of frequency domain resources in the first frequency sub-band.

Embodiment 2

Figure 2:
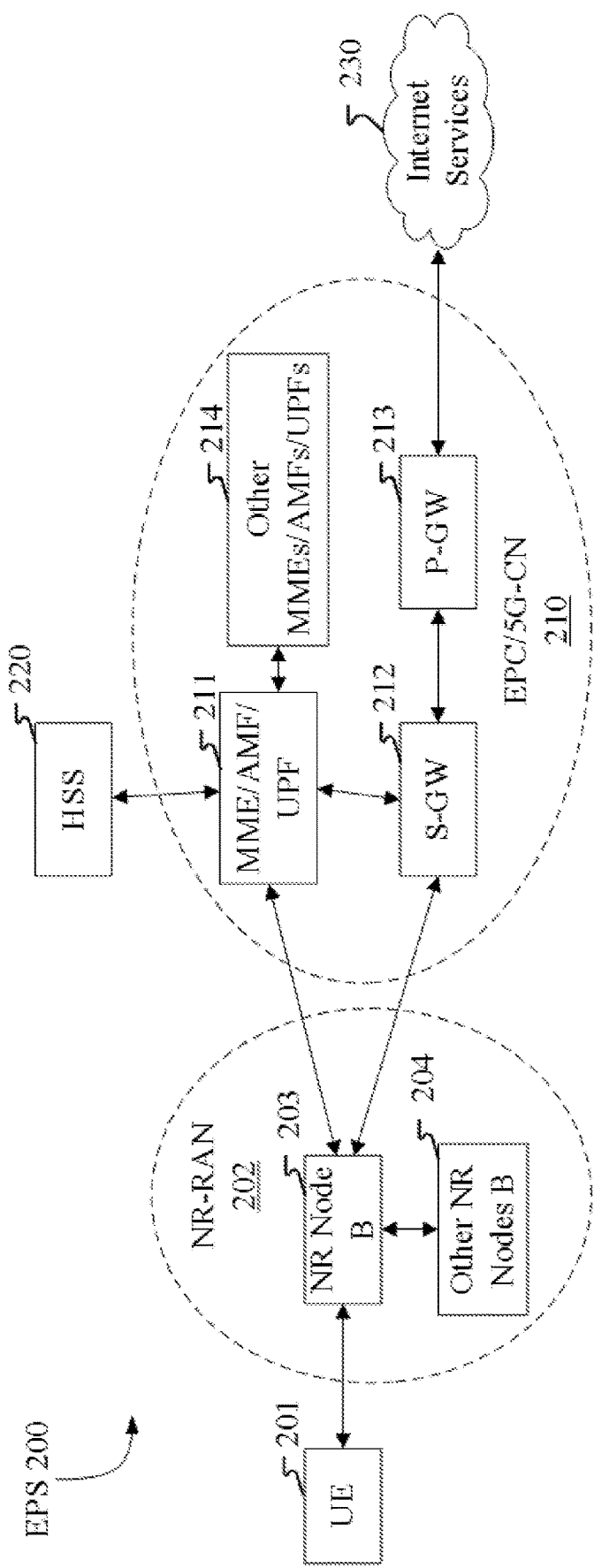
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a diagram of a network architecture according to the present disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other applicable terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BBS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-ground base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPF s 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Streaming Services (PSSs).

In one embodiment, the UE 201 corresponds to the UE in the present disclosure.

In one embodiment, the gNB 203 corresponds to the base station in the present disclosure.

In one embodiment, the UE 201 supports wireless communication for data transmission on unlicensed spectrum.

In one embodiment, the UE 201 supports wireless communication for data transmission on licensed spectrum.

In one embodiment, the gNB 203 supports wireless communication for data transmission on unlicensed spectrum.

In one embodiment, the gNB 203 supports wireless communication for data transmission on licensed spectrum.

In one embodiment, the UE 201 supports Massive Multi-Input Multi-Output (MIMO) based wireless communication.

In one embodiment, the gNB 203 supports Massive MIMO-based wireless communication.

Embodiment 3

Figure 3:
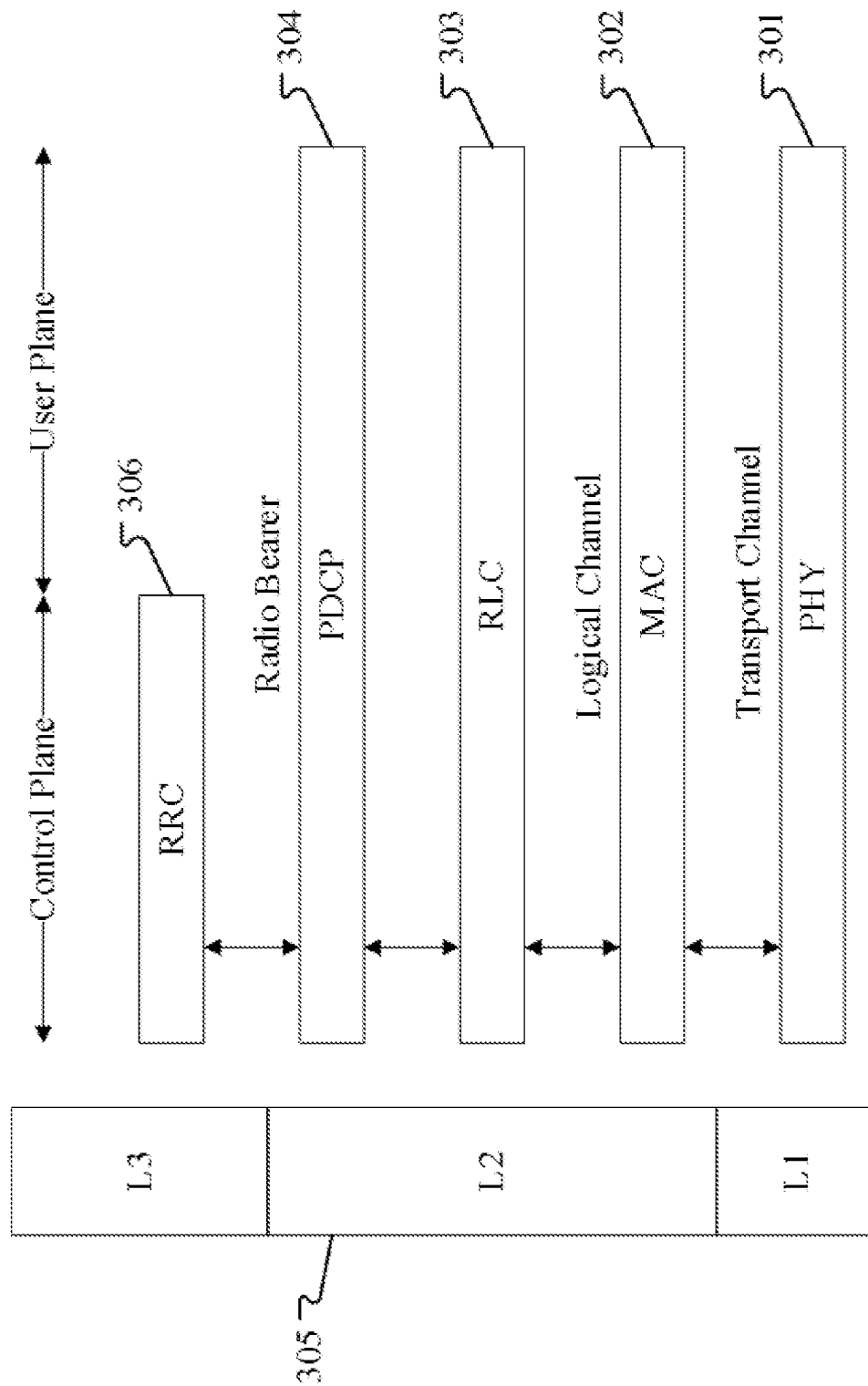
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first information in the present disclosure is generated by the PHY 301.

In one embodiment, the second information in the present disclosure is generated by the PHY 301.

In one embodiment, the second information in the present disclosure is generated by the RRC sublayer 306.

In one embodiment, the second information in the present disclosure is generated by the MAC sublayer 302.

In one embodiment, the third information in the present disclosure is generated by the RRC sublayer 306.

In one embodiment, the third information in the present disclosure is generated by the MAC sublayer 302.

In one embodiment, the first access detection in the present disclosure is generated by the PHY 301.

In one embodiment, the second access detection in the present disclosure is generated by the PHY 301.

In one embodiment, the third access detection in the present disclosure is generated by the PHY 301.

In one embodiment, the fourth access detection in the present disclosure is generated by the PHY 301.

In one embodiment, the K access detection(s) in the present disclosure is(are) generated by the PHY 301.

In one embodiment, the M access detection(s) in the present disclosure is(are) generated by the PHY 301.

In one embodiment, the first radio signal in the present disclosure is(are) generated by the PHY 301.

In one embodiment, the second radio signal in the present disclosure is(are) generated by the PHY 301.

In one embodiment, the target radio signal in the present disclosure is(are) generated by the PHY 301.

Embodiment 4

Figure 4:
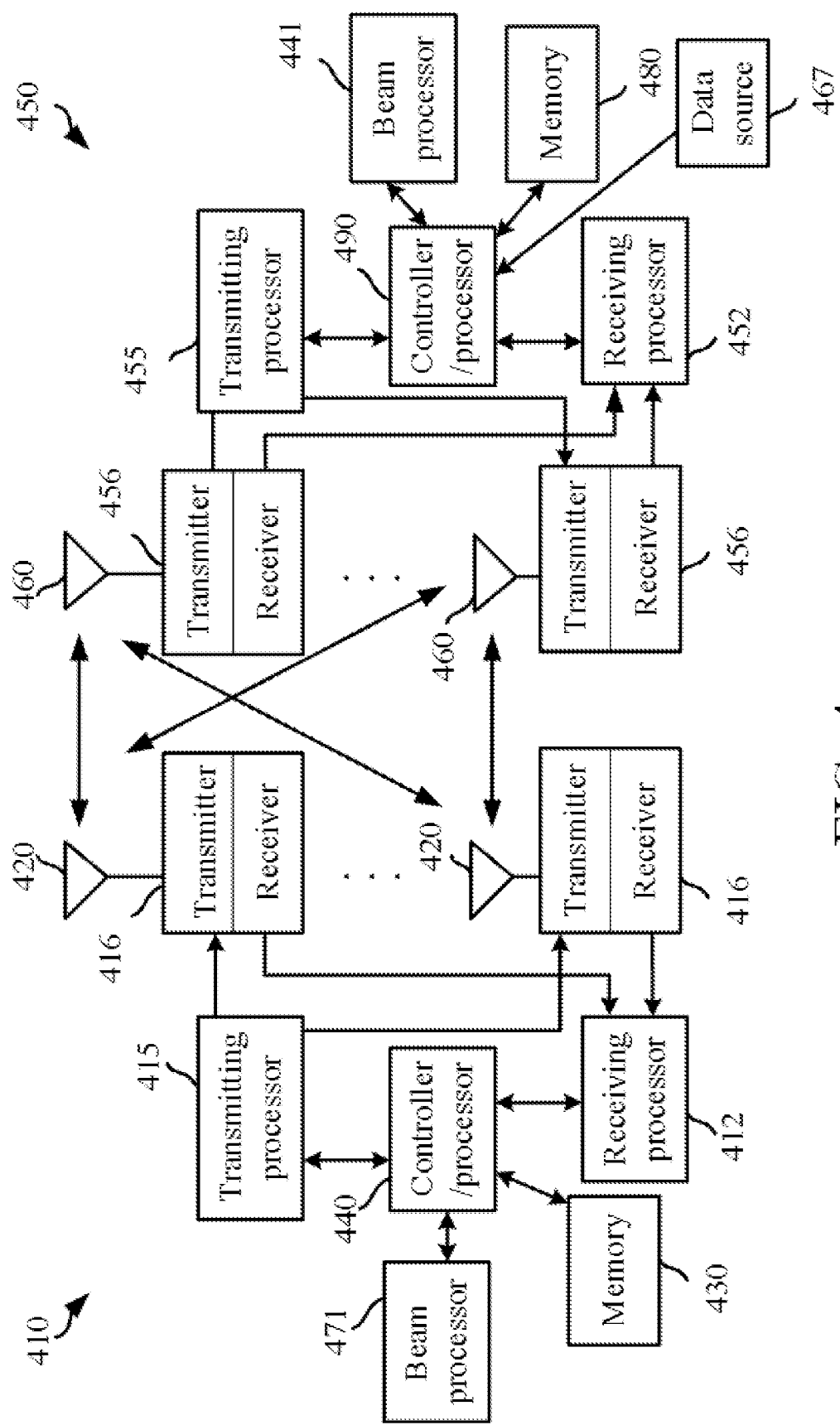
FIG. 4 illustrates a New Radio (NR) node and a UE according to one embodiment of the present disclosure.

Embodiment 4 illustrates a base station (New Radio (NR) node) and a UE according to the present disclosure, as shown in FIG. 4. FIG. 4 is a block diagram illustrating a UE 450 and a gNB 410 that are in communication with each other in access network.

The base station 410 comprises a controller/processor 440, a memory 430, a receiving processor 412, a beam processor 471, a transmitting processor 415, a transmitter/receiver 416 and an antenna 420.

The UE 450 comprises a controller/processor 490, a memory 480, a data source 467, a beam processor 441, a transmitting processor 455, a receiving processor 452, a transmitter/receiver 456 and an antenna 460.

In downlink transmission, processes relevant to the base station 410 include the following:

A packet from a higher layer is provided to the controller/processor 440. The controller/processor 440 provides header compression, encryption, packet segmentation and reordering, and multiplexing and demultiplexing between a logical channel and a transport channel so as to implement L2 protocol used for the user plane and the control plane; the higher-layer packet may include data or control information, for example, Downlink Shared Channel (DL-SCH).

The controller/processor 440 is connected to the memory 430 that stores program codes and data. The memory 430 may be a computer readable medium;

The controller/processor 440 comprises a scheduling unit for a transmission requirement, and the scheduling unit is configured to schedule an aerial resource corresponding to the transmission requirement;

The beam processor 471 determines first information;

The transmitting processor 415 receives a bit stream output from the controller/processor 440, and performs signal transmitting processing functions of an L1 layer (that is, PHY), including encoding, interleaving, scrambling, modulation, power control/allocation, generation of physical layer control signaling (including PBCH, PDCCH, PHICH, PCFICH, reference signal), etc.

The transmitting processor 415 receives a bit stream output from the controller/processor 440, and performs signal transmitting processing functions of an L1 layer (that is, PHY), including multi-antenna transmission, spreading, code division multiplexing and precoding;

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In downlink transmission, processes relevant to UE 450 include the following:

The receiver 456 is configured to convert a radio-frequency signal received via the antenna 460 into a baseband signal and provide the baseband signal to the receiving processor 452.

The receiving processor 452 performs signal receiving processing functions of an L1 layer (that is, PHY), including decoding, de-interleaving, descrambling, demodulation, extraction of physical layer control signaling, etc.

The receiving processor 452 performs signal receiving processing functions of an L1 layer (that is, PHY), including multi-antenna reception, despreading, code division multiplexing and precoding.

The beam processor 441 determines first information;

The controller/processor 490 receives a bit stream output from the receiving processor 452, and provides header decompression, decryption, packet segmentation and reordering, multiplexing and de-multiplexing between a logical channel and a transport channel, to implement the L2 protocol used for the user plane and the control plane.

The controller/processor 490 is connected to the memory 480 that stores program codes and data. The memory 480 may be a computer readable medium.

In uplink (UL) transmission, processes relevant to the base station 410 include the following:

The receiver 416 receives a radio frequency signal via a corresponding antenna 420, converts the received radio frequency signal into a baseband signal and provides the baseband signal to the receiving processor 412;

The receiving processor 412 performs signal receiving processing functions of the L1 layer (that is, PHY), including decoding, de-interleaving, descrambling, demodulation and extraction of physical layer control signaling;

The receiving processor 412 performs signal receiving processing functions of the L1 layer (that is, PHY), including multi-antenna reception, despreading, code division multiplexing and precoding;

The controller/processor 440 performs functions of the L2 layer, and is connected to the memory 430 that stores program codes and data;

The controller/processor 440 provides demultiplexing between a transport channel and a logical channel, packet reassembling, decryption, header decompression, and control signal processing so as to recover a higher-layer packet from the UE 450; a higher-layer packet coming from the controller/processor 440 can be provided to a core network;

The beam processor 471 determines a first radio signal is transmitted in a first frequency sub-band;

In UL transmission, processes relevant to the UE 450 include the following:

The data source 467 provides a higher-layer packet to the controller/processor 490. The data source 467 represents all protocol layers above the L2 layer;

The transmitter 456 transmits a radio frequency signal via a corresponding antenna 460, converting a baseband signal into a radio frequency signal, and provides the radio frequency signal to the corresponding antenna 460;

The transmitting processor 455 performs signal receiving functions of the L1 layer (that is, PHY), including encoding, interleaving, scrambling, modulation and generation of physical layer signaling;

The transmitting processor 455 performs signal receiving functions of the L1 layer (that is, PHY), including multi-antenna transmission, spreading, code division multiplexing and precoding;

The controller/processor 490, based on radio resources allocation for the gNB 410, performs header compression, encryption, packet segmentation and reordering, and multiplexing between a logical channel and a transport channel, so as to implement functions of the L2 layer on the user plane and the control plane;

The controller/processor 490 is also in charge of HARQ operation, retransmission of a lost packet and a signaling to the gNB 410;

The beam processor 441 determines to perform a first access detection or perform a second access detection, and transmits a first radio signal in a first frequency sub-band or drops transmission of the first radio signal in a first frequency sub-band.

In one embodiment, the UE 450 comprises at least one processor and at least one memory. The at least one memory includes computer program codes. The at least one memory and the computer program codes are configured to be used in collaboration with the at least one processor. The UE 450 at least receives first information, the first information being used for indicating K frequency sub-band(s), K is a positive integer; performs a first access detection, or performs a second access detection; and transmits a first radio signal in a first frequency sub-band, or drops transmission of the first radio signal in the first frequency sub-band; wherein the first frequency sub-band comprises frequency domain resources occupied by the first radio signal; if the first frequency sub-band belongs to the K frequency sub-band(s) and time domain resources occupied by the first radio signal belong to a first time window, the first access detection is performed, the first access detection is used for determining whether the first radio signal is transmitted in the first frequency sub-band; otherwise, the second access detection is performed, the second access detection is used for determining whether the first radio signal is transmitted in the first frequency sub-band; detection time for the first access detection is less than that for the second access detection.

In one embodiment, the UE 450 comprises a memory that stores a computer readable instruction program. The computer readable instruction program generates an action when executed by at least one processor. The action includes receiving first information, the first information being used for indicating K frequency sub-band(s), K is a positive integer; performing a first access detection, or performing a second access detection; and transmitting a first radio signal in a first frequency sub-band, or dropping transmission of the first radio signal in the first frequency sub-band; wherein the first frequency sub-band comprises frequency domain resources occupied by the first radio signal; if the first frequency sub-band belongs to the K frequency sub-band(s) and time domain resources occupied by the first radio signal belong to a first time window, the first access detection is performed, the first access detection is used for determining whether the first radio signal is transmitted in the first frequency sub-band; otherwise, the second access detection is performed, the second access detection is used for determining whether the first radio signal is transmitted in the first frequency sub-band; detection time for the first access detection is less than that for the second access detection.

In one embodiment, the gNB 410 comprises at least one processor and at least one memory. The at least one memory includes computer program codes. The at least one memory and the computer program codes are configured to be used in collaboration with the at least one processor. The gNB 410 at least transmits first information, the first information is used for indicating K frequency sub-band(s), K is a positive integer; and monitors in a first frequency sub-band whether a first radio signal is transmitted; wherein the first frequency sub-band comprises frequency domain resources occupied by the first radio signal; a transmitter of the first radio signal performs a first access detection or a second access detection; if the first frequency sub-band belongs to the K frequency sub-band(s) and time domain resources occupied by the first radio signal belong to a first time window, the first access detection is performed, the first access detection is used for determining whether the first radio signal is transmitted in the first frequency sub-band; otherwise, the second access detection is performed, the second access detection is used for determining whether the first radio signal is transmitted in the first frequency sub-band; detection time for the first access detection is less than that for the second access detection.

In one embodiment, the gNB 410 comprises a memory that stores a computer readable instruction program. The computer readable instruction program generates an action when executed by at least one processor. The action includes transmitting first information, the first information being used for indicating K frequency sub-band(s), K is a positive integer; and monitoring in a first frequency sub-band whether a first radio signal is transmitted; wherein the first frequency sub-band comprises frequency domain resources occupied by the first radio signal; a transmitter of the first radio signal performs a first access detection or a second access detection; if the first frequency sub-band belongs to the K frequency sub-band(s) and time domain resources occupied by the first radio signal belong to a first time window, the first access detection is performed, the first access detection is used for determining whether the first radio signal is transmitted in the first frequency sub-band; otherwise, the second access detection is performed, the second access detection is used for determining whether the first radio signal is transmitted in the first frequency sub-band; detection time for the first access detection is less than that for the second access detection.

In one embodiment, the UE 450 corresponds to the UE in the present disclosure.

In one embodiment, the gNB 410 corresponds to the base station in the present disclosure.

In one embodiment, at least the former two of the receiver 456, the receiving processor 452 and the controller/processor 490 are used for receiving the first information in the present disclosure.

In one embodiment, at least the former two of the transmitter 416, the transmitting processor 415 and the controller/processor 440 are used for transmitting the first information in the present disclosure.

In one embodiment, at least the former two of the receiver 456, the receiving processor 452 and the controller/processor 490 are used for receiving the second information in the present disclosure.

In one embodiment, at least the former two of the transmitter 416, the transmitting processor 415 and the controller/processor 440 are used for transmitting the second information in the present disclosure.

In one embodiment, at least the former two of the receiver 456, the receiving processor 452 and the controller/processor 490 are used for receiving the third information in the present disclosure.

In one embodiment, at least the former two of the transmitter 416, the transmitting processor 415 and the controller/processor 440 are used for transmitting the third information in the present disclosure.

In one embodiment, at least the former two of the receiver 456, the receiving processor 452 and the controller/processor 490 are used for performing the first access detection in the present disclosure.

In one embodiment, at least the former two of the receiver 456, the receiving processor 452 and the controller/processor 490 are used for performing the second access detection in the present disclosure.

In one embodiment, at least the former two of the receiver 456, the receiving processor 452 and the controller/processor 490 are used for performing the third access detection in the present disclosure.

In one embodiment, at least the former two of the receiver 456, the receiving processor 452 and the controller/processor 490 are used for performing the fourth access detection in the present disclosure.

In one embodiment, at least the former two of the receiver 416, the receiving processor 412 and the controller/processor 440 are used for performing the K access detection(s) in the present disclosure.

In one embodiment, at least the former two of the receiver 416, the receiving processor 412 and the controller/processor 440 are used for performing the M access detection(s) in the present disclosure.

In one embodiment, at least the former two of the transmitter 456, the transmitting processor 455 and the controller/processor 490 are used for transmitting the first radio signal of the present disclosure in the first frequency sub-band of the present disclosure.

In one embodiment, at least the former two of the receiver 416, the receiving processor 412 and the controller/processor 440 are used for receiving the first radio signal of the present disclosure in the first frequency sub-band of the present disclosure.

In one embodiment, at least the former two of the transmitter 456, the transmitting processor 455 and the controller/processor 490 are used for transmitting the second radio signal of the present disclosure in the second frequency sub-band of the present disclosure.

In one embodiment, at least the former two of the receiver 416, the receiving processor 412 and the controller/processor 440 are used for receiving the second radio signal of the present disclosure in the second frequency sub-band of the present disclosure.

In one embodiment, at least the former two of the receiver 416, the receiving processor 412 and the controller/processor 440 are used for monitoring in the first frequency sub-band of the present disclosure whether the first radio signal of the present disclosure is transmitted.

In one embodiment, at least the former two of the receiver 416, the receiving processor 412 and the controller/processor 440 are used for monitoring in the second frequency sub-band of the present disclosure whether the second radio signal of the present disclosure is transmitted.

Embodiment 5

Figure 5:
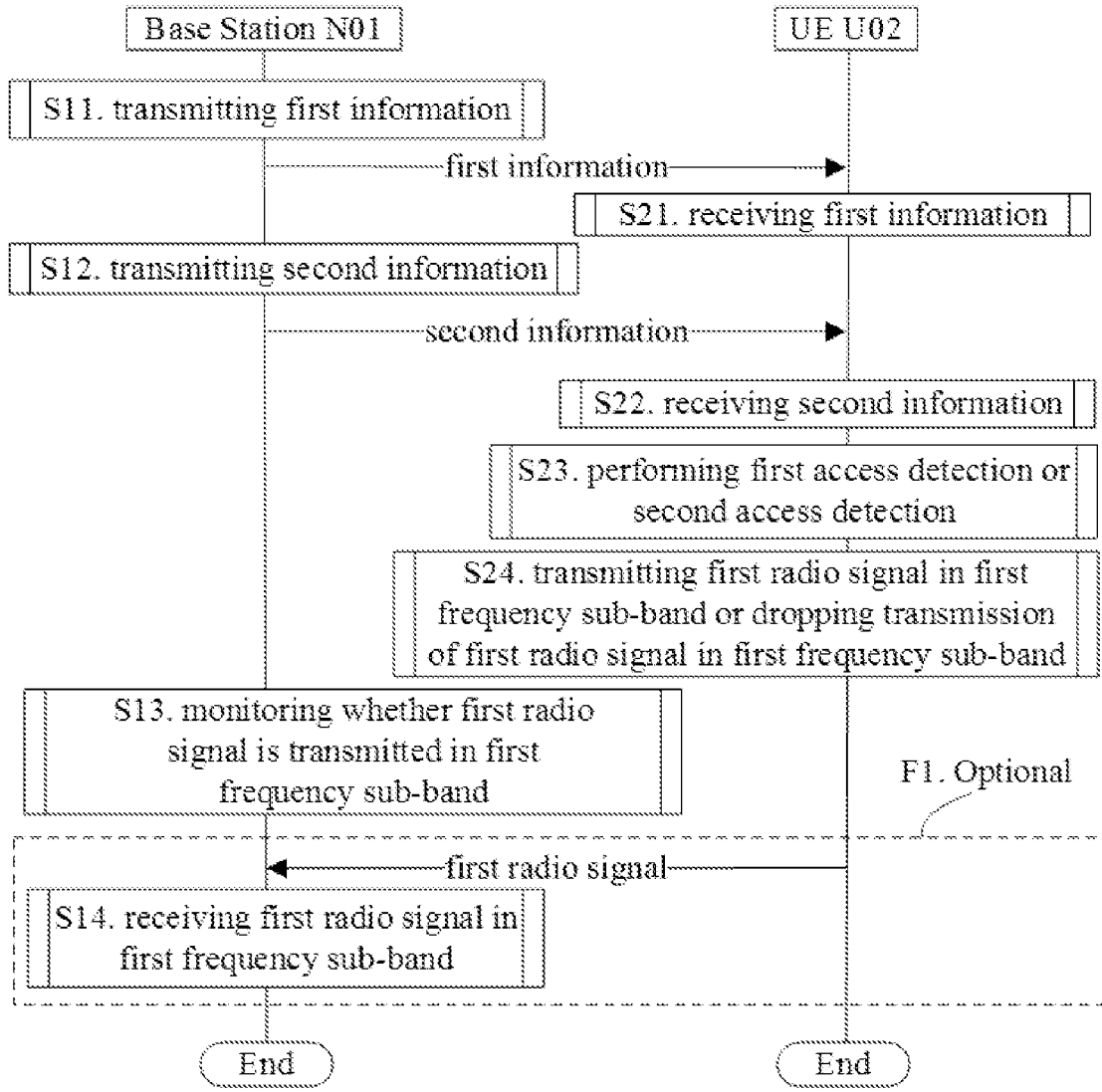
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is maintenance base station for a serving cell of a UE U02. In FIG. 5, a box F1 is optional.

The base station N01 transmits first information in step S11, transmits second information in step S12; monitors in a first frequency sub-band whether a first radio signal is transmitted in step S13; and receives a first radio signal in a first frequency sub-band in step S14.

The UE U02 receives first information in step S21; receives second information in step S22; performs a first access detection, or performs a second access detection in step S23; and transmits a first radio signal in a first frequency sub-band, or drops transmission of a first radio signal in a first frequency sub-band.

In Embodiment 5, the first information is used for indicating K frequency sub-band(s), K is a positive integer; the first frequency sub-band comprises frequency domain resources occupied by the first radio signal; if the first frequency sub-band belongs to the K frequency sub-band(s) and time domain resources occupied by the first radio signal belong to a first time window, the first access detection is performed, the first access detection is used by the UE U02 for determining whether the first radio signal is transmitted in the first frequency sub-band; otherwise, the second access detection is performed, the second access detection is used by the UE U02 for determining whether the first radio signal is transmitted in the first frequency sub-band; detection time for the first access detection is less than that for the second access detection. The second information is used by the UE U02 for determining at least one of the frequency domain resources occupied by the first radio signal and the time domain resources occupied by the second radio signal.

In one embodiment, a first radio signal is transmitted in a first frequency sub-band in step S24, a box F1 exists; transmission of a first radio signal in a first frequency sub-band is dropped in step S24, a box F1 does not exist.

In one embodiment, the K frequency sub-band(s) is(are) occupied by a transmitter of the first information.

In one embodiment, a transmitter of the first information transmits radio signals in any one frequency sub-band of the K frequency sub-band(s).

In one embodiment, a transmitter of the first information determines through energy detection that the K frequency sub-band(s) is(are) idle.

In one embodiment, a transmitter of the first information determines through K access detection(s) respectively that the K frequency sub-band(s) is(are) idle.

In one subembodiment of the above embodiment, the K frequency sub-band(s) correspond(correspond) to K time window(s) respectively, the first time window is a time window of the K time window(s).

In one subembodiment of the above embodiment, the K frequency sub-band(s) correspond(correspond) to K time window(s) respectively, the first frequency sub-band is a frequency sub-band of the K frequency sub-band(s), the first time window is a time window corresponding to the first frequency sub-band.

In one subembodiment of the above embodiment, the K frequency sub-band(s) correspond(correspond) to K time window(s) respectively, the second time window is a time window of the K time window(s).

In one subembodiment of the above embodiment, the K frequency sub-band(s) correspond(correspond) to K time window(s) respectively, the second frequency sub-band is a frequency sub-band of the K frequency sub-band(s), the second time window is a time window corresponding to the second frequency sub-band.

In one subembodiment of the above embodiment, the first time window corresponds to the K frequency sub-band(s).

In one embodiment, a transmitter of the first information performs M access detection(s), M frequency sub-band(s) comprises(comprise) the K frequency sub-band(s), the M access detection(s) corresponds(correspond) to M frequency sub-band(s) respectively, K access detection(s) corresponding to the K frequency sub-band(s) of the M frequency sub-band(s) determines(determine) that all the K frequency sub-band(s) is(are) idle, any one access detection other than the K access detection(s) among the M access detection(s) determines that a frequency sub-band of the corresponding M frequency sub-band(s) is not idle.

In one embodiment, the second information explicitly indicates at least one of the frequency domain resources occupied by the first radio signal and the time domain resources occupied by the first radio signal.

In one embodiment, the second information implicitly indicates at least one of the frequency domain resources occupied by the first radio signal and the time domain resources occupied by the first radio signal.

In one embodiment, the second information is semi-statically configured.

In one embodiment, the second information is carried by a higher-layer signaling.

In one embodiment, the second information is carried by an RRC signaling.

In one embodiment, the second information comprises all or part of an Information Element (IE) in an RRC signaling.

In one embodiment, the second information comprises a part of an IE in an RRC signaling.

In one embodiment, the second information comprises one or multiple IEs in an RRC signaling.

In one embodiment, the second information comprises multiple IEs in an RRC signaling.

In one embodiment, the second information is carried by a MAC CE signaling.

In one embodiment, the second information is dynamically configured.

In one embodiment, the second information is carried by a physical layer signaling.

In one embodiment, the second information belongs to DCI.

In one embodiment, the second information belongs to a field of DCI, the field comprises a positive integer number of bit(s).

In one embodiment, the second information is transmitted on a frequency band deployed on unlicensed spectrum.

In one embodiment, the second information is transmitted on a frequency band deployed on licensed spectrum.

In one embodiment, the second information is transmitted on the first frequency sub-band.

In one embodiment, the second information is transmitted on a frequency sub-band other than the first frequency sub-band.

In one embodiment, the second information is transmitted on a frequency band deployed on licensed spectrum other than the first frequency sub-band.

In one embodiment, the second information is transmitted on a frequency band deployed on unlicensed spectrum other than the first frequency sub-band.

In one embodiment, the second information is transmitted on a frequency sub-band of the K frequency sub-band(s).

In one embodiment, the second information is transmitted on a frequency band other than the K frequency sub-band(s).

In one embodiment, the second information is transmitted on a frequency band deployed on licensed spectrum other than the K frequency sub-band(s).

In one embodiment, the second information is transmitted on a frequency band deployed on unlicensed spectrum other than the K frequency sub-band(s).

In one embodiment, a signaling identifier for a signaling carrying the second information is C-RNTI.

In one embodiment, the second information belongs to DCI identified by C-RNTI.

In one embodiment, C-RNTI is used for generating an RS sequence of DMRS corresponding to a signaling carrying the second information.

In one embodiment, a CRC bit sequence for a signaling carrying the second information is scrambled by C-RNTI.

In one embodiment, the second information belongs to a UE-specific DCI.

In one embodiment, the second information is UE-specific.

In one embodiment, the second information is transmitted on a downlink physical layer data channel (i.e., a downlink channel that can be used for carrying physical layer data).

In one subembodiment of the above embodiment, the downlink physical layer data channel is Physical Downlink Shared Channel (PDSCH).

In one subembodiment of the above embodiment, the downlink physical layer data channel is short PDSCH (sPDSCH).

In one subembodiment of the above embodiment, the downlink physical layer data channel is New Radio PDSCH (NR-PDSCH).

In one subembodiment of the above embodiment, the downlink physical layer data channel is Narrow Band PDSCH (NB-PDSCH).

In one embodiment, the second information is carried by a downlink physical layer control channel (i.e., a downlink channel that can only be used for carrying physical layer signaling).

In one subembodiment of the above embodiment, the downlink physical layer data channel is PDCCH.

In one subembodiment of the above embodiment, the downlink physical layer data channel is sPDCCH.

In one subembodiment of the above embodiment, the downlink physical layer data channel is NR-PDCCH.

In one subembodiment of the above embodiment, the downlink physical layer data channel is NB-PDCCH.

In one embodiment, the first information and the second information belong to different kinds of DCI respectively.

In one embodiment, the first information and the second information are a first field and a second field of the same DCI respectively.

In one embodiment, the second information is used for indicating at least one of the frequency domain resources occupied by the first radio signal and the time domain resources occupied by the first radio signal.

In one embodiment, the second information explicitly indicates at least one of the frequency domain resources occupied by the first radio signal and the time domain resources occupied by the first radio signal.

In one embodiment, the second information implicitly indicates at least one of the frequency domain resources occupied by the first radio signal and the time domain resources occupied by the first radio signal.

Embodiment 6

Figure 6:
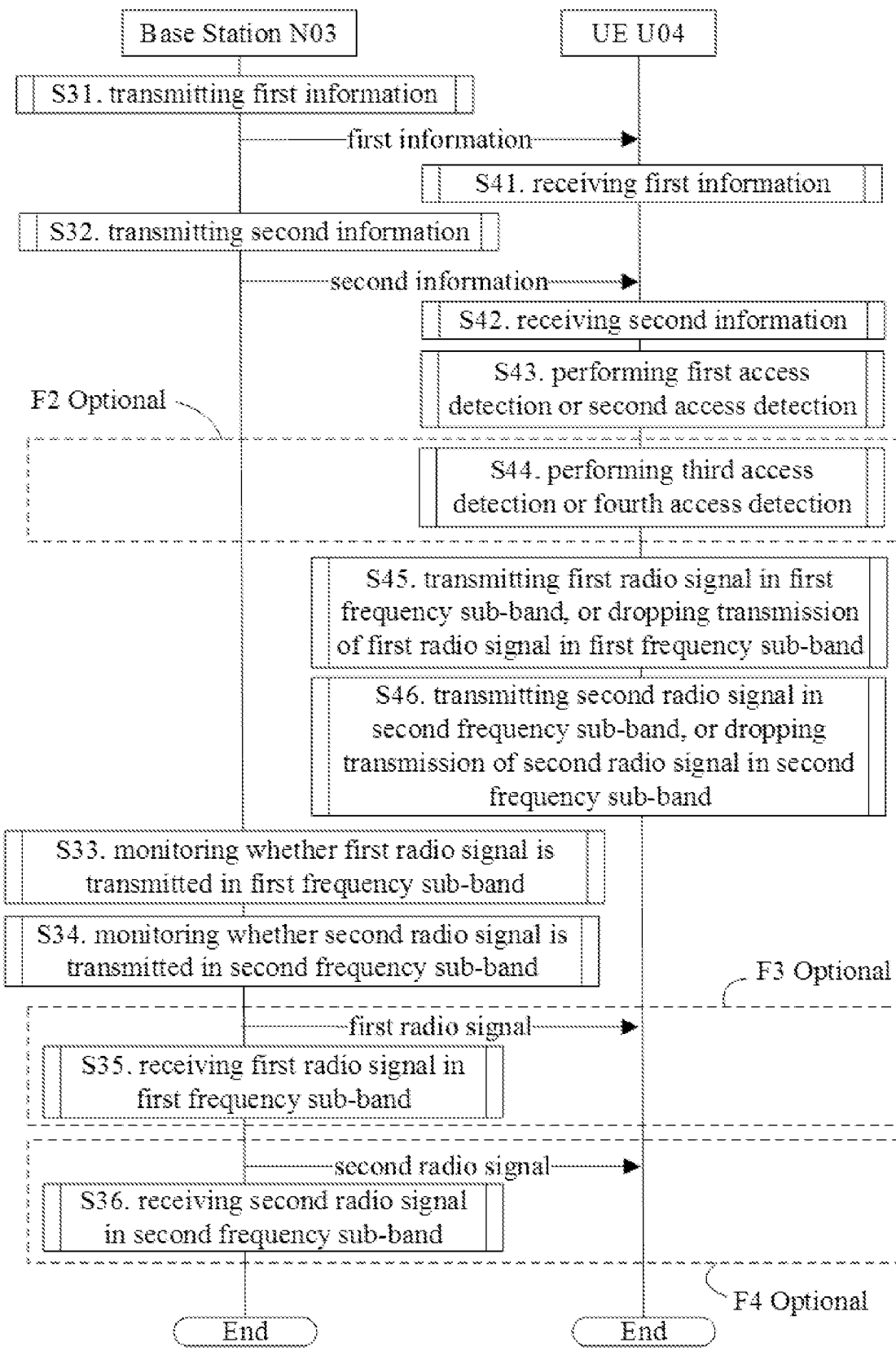
FIG. 6 illustrates a flowchart of wireless transmission according to another embodiment of the present disclosure.

Embodiment 6 illustrates another flowchart of wireless transmission, as shown in FIG. 6. In FIG. 6, a base station N03 is a maintenance base station for a serving cell of a UE U04. In FIG. 6, boxes F2, F3 and F4 are optional.

The base station N03 transmits first information in step S31; transmits second information in step S32; monitors in a first frequency sub-band whether a first radio signal is transmitted in step S33; monitors in a second frequency sub-band whether a second radio signal is transmitted in step S34; receives a first radio signal in a first frequency sub-band in step S35; and receives a second radio signal in a second frequency sub-band in step S36.

The UE U04 receives first information in step S41; receives second information in step S42; performs a first access detection, or performs a second access detection in step S43; performs a third access detection, or performs a fourth access detection in step S44; transmits a first radio signal in a first frequency sub-band, or drops transmission of a first radio signal in a first frequency sub-band in step S45; and transmits a second radio signal in a second frequency sub-band, or drops transmission of a second radio signal in a second frequency sub-band in step S46.

In Embodiment 6, the first information is used for indicating K frequency sub-band(s), K is a positive integer; the first frequency sub-band comprises frequency domain resources occupied by the first radio signal; if the first frequency sub-band belongs to the K frequency sub-band(s) and time domain resources occupied by the first radio signal belong to a first time window, the first access detection is performed, the first access detection is used by the UE U04 for determining whether the first radio signal is transmitted in the first frequency sub-band; otherwise, the second access detection is performed, the second access detection is used by the UE U04 for determining whether the first radio signal is transmitted in the first frequency sub-band; detection time for the first access detection is less than that for the second access detection. The second information is used by the UE U04 for determining at least one of the frequency domain resources occupied by the first radio signal and the time domain resources occupied by the second radio signal. The second frequency sub-band comprises frequency domain resources occupied by the second radio signal, start time for transmission of the first radio signal and that of the second radio signal are the same, the first frequency sub-band and the second frequency sub-band are orthogonal in frequency domain. If the second frequency sub-band belongs to the K frequency sub-band(s) and time domain resources occupied by the second radio signal belong to a second time window, the third access detection is performed, the third access detection is used by the UE U04 for determining whether the second radio signal is transmitted in the second frequency sub-band; otherwise, the fourth access detection is performed, the fourth access detection is used by the UE U04 for determining whether the second radio signal is transmitted in the second frequency sub-band; detection time for the third access detection is less than that for the fourth access detection.

In one embodiment, a first radio signal is transmitted in a first frequency sub-band in step S45, a box F3 exists; transmission a first radio signal in a first frequency sub-band is dropped in step S45, a box F3 does not exist.

In one embodiment, a second radio signal is transmitted in a second frequency sub-band in step S46, a box F4 exists; transmission a second radio signal in a second frequency sub-band is dropped in step S46, a box F4 does not exist.

In one embodiment, the second frequency sub-band is a CORESET.

In one embodiment, the second frequency sub-band occupies a positive integer number of PRB(s).

In one embodiment, the second frequency sub-band occupies a positive integer number of subcarrier(s).

In one embodiment, the second frequency sub-band belongs to unlicensed spectrum.

In one embodiment, the second frequency sub-band is a BWP.

In one embodiment, the second frequency sub-band is a CC.

In one embodiment, the second frequency sub-band is a serving cell.

In one embodiment, the second frequency sub-band is a sub-band.

In one embodiment, the second frequency sub-band is a frequency sub-band of the K frequency sub-band(s).

In one embodiment, the second frequency sub-band is a frequency sub-band of the M frequency sub-band(s).

In one embodiment, the second frequency sub-band is a frequency sub-band of the M frequency sub-bands that does not belong to the K frequency sub-band(s).

In one embodiment, the second frequency sub-band is not one of the K frequency sub-band(s).

In one embodiment, the second frequency sub-band and each of the K frequency sub-band(s) are orthogonal (not overlapping).

In one embodiment, the second frequency sub-band and the first frequency sub-band are orthogonal (not overlapping).

In one embodiment, the second radio signal comprises at least one of data, control information and a reference signal.

In one embodiment, the second radio signal comprises data.

In one embodiment, the second radio signal comprises control information.

In one embodiment, the second radio signal comprises a reference signal.

In one embodiment, the second radio signal comprises data, control information and a reference signal.

In one embodiment, the second radio signal comprises data and control information.

In one embodiment, the second radio signal comprises control information and a reference signal.

In one embodiment, the second radio signal comprises data and a reference signal.

In one embodiment, the data comprised in the second radio signal is uplink data.

In one embodiment, the control information comprised in the second radio signal is UCI.

In one embodiment, the control information comprised in the second radio signal comprises at least one of HARQ feedback, a HARQ process number, an NDI, start time for transmission of the first radio signal, CSI and an SR.

In one subembodiment of the above embodiment, the CSI comprises at least one of RI, a PMI, a CQI, and a CRI.

In one subembodiment of the above embodiment, the HARQ process number is a number of HARQ process corresponding to the data comprised in the second radio signal.

In one subembodiment of the above embodiment, the NDI indicates whether the data comprised in the second radio signal is new data or retransmitted old data.

In one subembodiment of the above embodiment, the reference signal comprised in the second radio signal comprises one or more of DMRS, SRS, and PTRS.

In one embodiment, the reference signal comprised in the second radio signal comprises SRS.

In one embodiment, the reference signal comprised in the second radio signal comprises DMRS.

In one embodiment, the reference signal comprised in the second radio signal comprises PTRS.

In one embodiment, the second radio signal is transmitted on an uplink random access channel.

In one subembodiment of the above embodiment, the uplink random access channel is a PRACH.

In one embodiment, a transmission channel for the second radio signal is a UL-SCH.

In one embodiment, the second radio signal is transmitted on an uplink physical layer data channel.

In one subembodiment of the above embodiment, the uplink physical layer data channel is a PUSCH.

In one subembodiment of the above embodiment, the uplink physical layer data channel is an sPUSCH.

In one subembodiment of the above embodiment, the uplink physical layer data channel is an NR-PUSCH.

In one subembodiment of the above embodiment, the uplink physical layer data channel is an NB-PUSCH.

In one embodiment, the second radio signal is transmitted on an uplink physical layer control channel.

In one subembodiment of the above embodiment, the uplink physical layer control channel is a PUCCH.

In one subembodiment of the above embodiment, the uplink physical layer control channel is an sPUCCH.

In one subembodiment of the above embodiment, the uplink physical layer control channel is an NR-PUCCH.

In one subembodiment of the above embodiment, the uplink physical layer control channel is an NB-PUCCH.

In one embodiment, end time for transmission of the first radio signal and that of the second radio signal are the same.

In one embodiment, end time for transmission of the first radio signal and that of the second radio signal are different.

In one embodiment, the second information is used for indicating frequency domain resources occupied by target radio signals and the time domain resources occupied by the target radio signals.

In one subembodiment of the above embodiment, the target radio signals comprise the first radio signal and J sub-signal(s), the first radio signal and each of the J sub-signal(s) are orthogonal in frequency domain, the second radio signal is any one sub-signal of the J sub-signal(s), J is a positive integer not greater than M; M frequency sub-band(s) comprises(comprise) the K frequency sub-band(s), frequency domain resources reserved by the J sub-signal(s) belongs(belong) to J frequency sub-band(s) of the M frequency sub-band(s) respectively, the second frequency sub-band is a frequency sub-band of the J frequency sub-band(s).

In one subembodiment of the above embodiment, the frequency domain resources occupied by the target radio signals comprise the frequency domain resources occupied by the first radio signal.

In one subembodiment of the above embodiment, the time domain resources occupied by the target radio signals comprise the time domain resources occupied by the first radio signal.

In one subembodiment of the above embodiment, the frequency domain resources occupied by the target radio signals comprise the frequency domain resources occupied by the first radio signal and the frequency domain resources occupied by the second radio signal.

In one subembodiment of the above embodiment, the time domain resources occupied by the target radio signals comprise the time domain resources occupied by the first radio signal and the time domain resources occupied by the second radio signal.

In one subembodiment of the above embodiment, the frequency domain resources occupied by the target radio signals comprise the frequency domain resources occupied by the first radio signal and frequency domain resources occupied by the J radio signal(s).

In one subembodiment of the above embodiment, the time domain resources occupied by the target radio signals comprise the time domain resources occupied by the first radio signal and time domain resources occupied by the J radio signal(s).

In one embodiment, the target radio signals comprise at least one of data, control information and a reference signal.

In one embodiment, the target radio signals comprise data.

In one embodiment, the target radio signals comprise control information.

In one embodiment, the target radio signals comprise a reference signal.

In one embodiment, the target radio signals comprise data, control information and a reference signal.

In one embodiment, the target radio signals comprise data and control information.

In one embodiment, the target radio signals comprise control information and a reference signal.

In one embodiment, the target radio signals comprise data and a reference signal.

In one embodiment, the data comprised in the target radio signals is uplink data.

In one embodiment, the control information comprised in the target radio signals is UCI.

In one embodiment, the control information comprised in the target radio signals comprises at least one of at least one of HARQ feedback, a HARQ process number, an NDI, start time for transmission of the target radio signals, CSI and an SR.

In one subembodiment of the above embodiment, the CSI comprises at least one of RI, a PMI, a CQI, and a CRI.

In one subembodiment of the above embodiment, the HARQ process number is a number of HARQ process corresponding to the data comprised in the target radio signals.

In one subembodiment of the above embodiment, the NDI indicates whether the data comprised in the target radio signals is new data or retransmitted old data.

In one subembodiment of the above embodiment, the reference signal comprised in the target radio signals comprises one or more of DMRS, SRS, and PTRS.

In one embodiment, the reference signal comprised in the target radio signals comprises SRS.

In one embodiment, the reference signal comprised in the target radio signals comprises DMRS.

In one embodiment, the reference signal comprised in the target radio signals comprises PTRS.

In one embodiment, the target radio signals are transmitted on an uplink random access channel.

In one subembodiment of the above embodiment, the uplink random access channel is a PRACH.

In one embodiment, a transmission channel for the target radio signals is a UL-SCH.

In one embodiment, the target radio signals are transmitted on an uplink physical layer data channel.

In one subembodiment of the above embodiment, the uplink physical layer data channel is a PUSCH.

In one subembodiment of the above embodiment, the uplink physical layer data channel is an sPUSCH.

In one subembodiment of the above embodiment, the uplink physical layer data channel is an NR-PUSCH.

In one subembodiment of the above embodiment, the uplink physical layer data channel is an NB-PUSCH.

In one embodiment, the target radio signals are transmitted on an uplink physical layer control channel.

In one subembodiment of the above embodiment, the uplink physical layer control channel is a PUCCH.

In one subembodiment of the above embodiment, the uplink physical layer control channel is an sPUCCH.

In one subembodiment of the above embodiment, the uplink physical layer control channel is an NR-PUCCH.

In one subembodiment of the above embodiment, the uplink physical layer control channel is an NB-PUCCH.

In one embodiment, the above method further comprises:
receiving the first radio signal in the first frequency sub-band;
wherein monitoring in the second frequency sub-band that the second radio signal is transmitted.

In one embodiment, the monitoring refers to blind detection, which means receiving a signal and performing decoding operation, if decoding is determined to be correct based on Cyclic Redundancy Check (CRC) bits, a given radio signal is then determined to be transmitted in a given frequency band; otherwise, the given radio signal is determined not to be transmitted in the given frequency band.

In one subembodiment of the above embodiment, the given frequency band is the first frequency sub-band, the given radio signal is the first radio signal.

In one subembodiment of the above embodiment, the given frequency band is the second frequency sub-band, the given radio signal is the second radio signal.

In one embodiment, the monitoring refers to coherent detection, which means using an RS sequence of DMRS on a physical layer channel which transmits a given radio signal for coherent reception, and measuring energy of signals received after the coherent reception. If the energy of signals received after the coherent reception is greater than a first given threshold, the given radio signal is determined to be transmitted in the given frequency band; otherwise, the given radio signal is determined not to be transmitted in the given frequency band.

In one subembodiment of the above embodiment, the given frequency band is the first frequency sub-band, the given radio signal is the first radio signal.

In one subembodiment of the above embodiment, the given frequency band is the second frequency sub-band, the given radio signal is the second radio signal.

In one embodiment, the monitoring refers to energy detection, which means sensing energy of a radio signal and averaging the energy in time so as to acquire the receiving energy. If the receiving energy is greater than a second given threshold, a given radio signal is determined to be transmitted in a given frequency band; otherwise, the given radio signal is determined not to be transmitted in the given frequency band.

In one subembodiment of the above embodiment, the given frequency band is the first frequency sub-band, the given radio signal is the first radio signal.

In one subembodiment of the above embodiment, the given frequency band is the second frequency sub-band, the given radio signal is the second radio signal.

In one embodiment, the monitoring refers to coherent detection, which means using a sequence of a given radio signal for coherent reception, and measuring energy of signals received after the coherent reception. If the energy of signals received after the coherent reception is greater than a third given threshold, the given radio signal is determined to be transmitted in the given frequency band; otherwise, the given radio signal is determined not to be transmitted in the given frequency band.

In one subembodiment of the above embodiment, the given frequency band is the first frequency sub-band, the given radio signal is the first radio signal.

In one subembodiment of the above embodiment, the given frequency band is the second frequency sub-band, the given radio signal is the second radio signal.

In one embodiment, a given node determines based on energy of a receiving signal on given time-frequency resources whether a given radio signal is transmitted on the given time-frequency resources.

In one subembodiment of the above embodiment, the given node is the base station.

In one subembodiment of the above embodiment, the given time-frequency resources are time-frequency resources reserved for the first radio signal, the given radio signal is the first radio signal.

In one subembodiment of the above embodiment, the given time-frequency resources are time-frequency resources reserved for the second radio signal, the given radio signal is the second radio signal.

In one subembodiment of the above embodiment, if energy of a receiving signal on the given time-frequency resources is lower, the given node assumes that the given radio signal is not transmitted on the given time-frequency resources, otherwise, the given node assumes that the given radio signal is transmitted on the given time-frequency resources.

In one subembodiment of the above embodiment, if energy of a receiving signal on the given time-frequency resources is lower than a reference energy threshold, the given node assumes that the given radio signal is not transmitted on the given time-frequency resources, otherwise, the given node assumes that the given radio signal is transmitted on the given time-frequency resources; the reference energy threshold is configured by the given node by itself.

In one embodiment, a given node determines based on power of a receiving signal on given time-frequency resources whether a given radio signal is transmitted on the given time-frequency resources.

In one subembodiment of the above embodiment, the given node is the base station.

In one subembodiment of the above embodiment, the given time-frequency resources are time-frequency resources reserved for the first radio signal, the given radio signal is the first radio signal.

In one subembodiment of the above embodiment, the given time-frequency resources are time-frequency resources reserved for the second radio signal, the given radio signal is the second radio signal.

In one subembodiment of the above embodiment, if power of a receiving signal on the given time-frequency resources is lower, the given node assumes that the given radio signal is not transmitted on the given time-frequency resources, otherwise, the given node assumes that the given radio signal is transmitted on the given time-frequency resources.

In one subembodiment of the above embodiment, if power of a receiving signal on the given time-frequency resources is lower than a reference power threshold, the given node assumes that the given radio signal is not transmitted on the given time-frequency resources, otherwise, the given node assumes that the given radio signal is transmitted on the given time-frequency resources; the reference power threshold is configured by the given node by itself.

In one embodiment, a given node determines based on correlation between a receiving signal and a given radio signal on given time-frequency resources whether the given radio signal is transmitted on the given time-frequency resources.

In one subembodiment of the above embodiment, the given node is the base station.

In one subembodiment of the above embodiment, the given time-frequency resources are time-frequency resources reserved for the first radio signal, the given radio signal is the first radio signal.

In one subembodiment of the above embodiment, the given time-frequency resources are time-frequency resources reserved for the second radio signal, the given radio signal is the second radio signal.

In one subembodiment of the above embodiment, if correlation between a receiving signal and the given radio signal on the given time-frequency resources is lower, the given node assumes that the given radio signal is not transmitted on the given time-frequency resources, otherwise, the given node assumes that the given radio signal is transmitted on the given time-frequency resources.

In one subembodiment of the above embodiment, if correlation between a receiving signal and the given radio signal on the given time-frequency resources is lower than a reference correlation threshold, the given node assumes that the given radio signal is not transmitted on the given time-frequency resources, otherwise, the given node assumes that the given radio signal is transmitted on the given time-frequency resources; the reference power threshold is configured by the given node by itself.

In one embodiment, a given node measures a receiving signal on given time-frequency resources based on a configuration parameter of a given radio signal so as to estimate a channel. The given node determines based on the channel whether the given radio signal is transmitted on the given time-frequency resources.

In one subembodiment of the above embodiment, the given node is the base station.

In one subembodiment of the above embodiment, the given time-frequency resources are time-frequency resources reserved for the first radio signal, the given radio signal is the first radio signal.

In one subembodiment of the above embodiment, the given time-frequency resources are time-frequency resources reserved for the second radio signal, the given radio signal is the second radio signal.

In one subembodiment of the above embodiment, if energy of the channel estimated is lower, the given node assumes that the given radio signal is not transmitted on the given time-frequency resources, otherwise, the given node assumes that the given radio signal is transmitted on the given time-frequency resources.

In one subembodiment of the above embodiment, if energy of the channel estimated is lower than a reference channel energy threshold, the given node assumes that the given radio signal is not transmitted on the given time-frequency resources, otherwise, the given node assumes that the given radio signal is transmitted on the given time-frequency resources; the reference channel energy threshold is configured by the given node by itself.

In one subembodiment of the above embodiment, if power of the channel estimated is lower, the given node assumes that the given radio signal is not transmitted on the given time-frequency resources, otherwise, the given node assumes that the given radio signal is transmitted on the given time-frequency resources.

In one subembodiment of the above embodiment, if power of the channel estimated is lower than a reference channel power threshold, the given node assumes that the given radio signal is not transmitted on the given time-frequency resources, otherwise, the given node assumes that the given radio signal is transmitted on the given time-frequency resources; the reference channel power threshold is configured by the given node by itself.

In one subembodiment of the above embodiment, if characteristics of the channel estimated do not agree with necessary characteristics assumed by the given node, the given node assumes that the given radio signal is not transmitted on the given time-frequency resources, otherwise, the given node assumes that the given radio signal is transmitted on the given time-frequency resources.

In one embodiment, if the second frequency sub-band is a frequency sub-band other than the K frequency sub-band(s), the fourth access detection is performed.

In one embodiment, if the second frequency sub-band is one frequency sub-band of the K frequency sub-band(s), time domain resources occupied by the second radio signal comprise time domain resources other than the second time window, the fourth access detection is performed.

In one embodiment, the third access detection is used for determining whether a radio signal can be transmitted on all or part of frequency domain resources in the second frequency sub-band.

In one embodiment, the fourth access detection is used for determining whether a radio signal can be transmitted on all or part of frequency domain resources in the second frequency sub-band.

In one embodiment, duration time for the second time window in time frequency is a Max Channel Occupy Time (MCOT) for the second frequency sub-band.

In one embodiment, the second time window is a MCOT for the second frequency sub-band.

In one embodiment, the second time window comprises a positive integer number of consecutive time units in time domain.

In one embodiment, a transmitter of the first information cannot occupy the second frequency sub-band after the second time window.

In one embodiment, a transmitter of the first information needs to determine through energy detection that the second frequency sub-band is not occupied after the second time window.

In one embodiment, a transmitter of the first information needs to determine through access detection that the second frequency sub-band is not occupied after the second time window; the access detection is LBT, or the access detection is CCA.

In one embodiment, a transmitter of the first information needs to determine through channel detection that the second frequency sub-band is not occupied after the second time window; the channel detection is LBT, or the channel detection is CCA.

In one embodiment, time domain resources comprised by the first time window and time domain resources comprised by the second time window are partially or entirely overlapping.

In one embodiment, time domain resources comprised by the first time window and time domain resources comprised by the second time window are the same.

In one embodiment, time domain resources comprised by the first time window and time domain resources comprised by the second time window are partially overlapping.

In one embodiment, time domain resources comprised by the first time window and time domain resources comprised by the second time window are orthogonal (not overlapping).

Embodiment 7

Figure 7A:
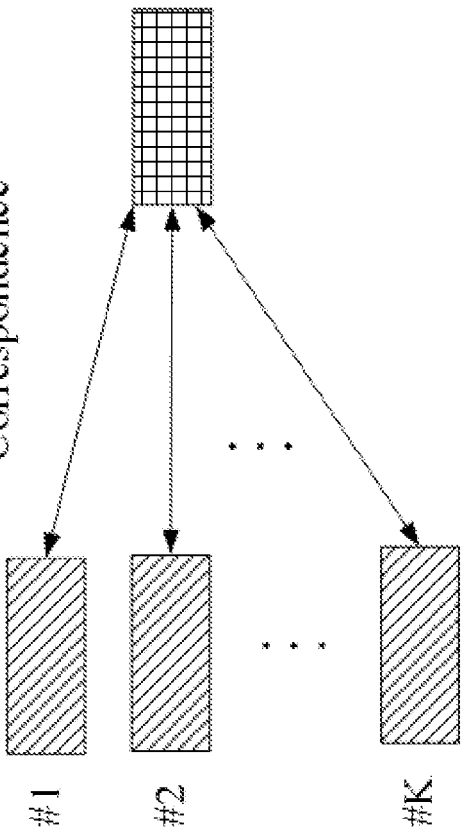
FIG. 7A-7B illustrates a schematic diagram of relationship between a first time window and K frequency sub-band(s) according to one embodiment of the present disclosure.
Figure 7B:
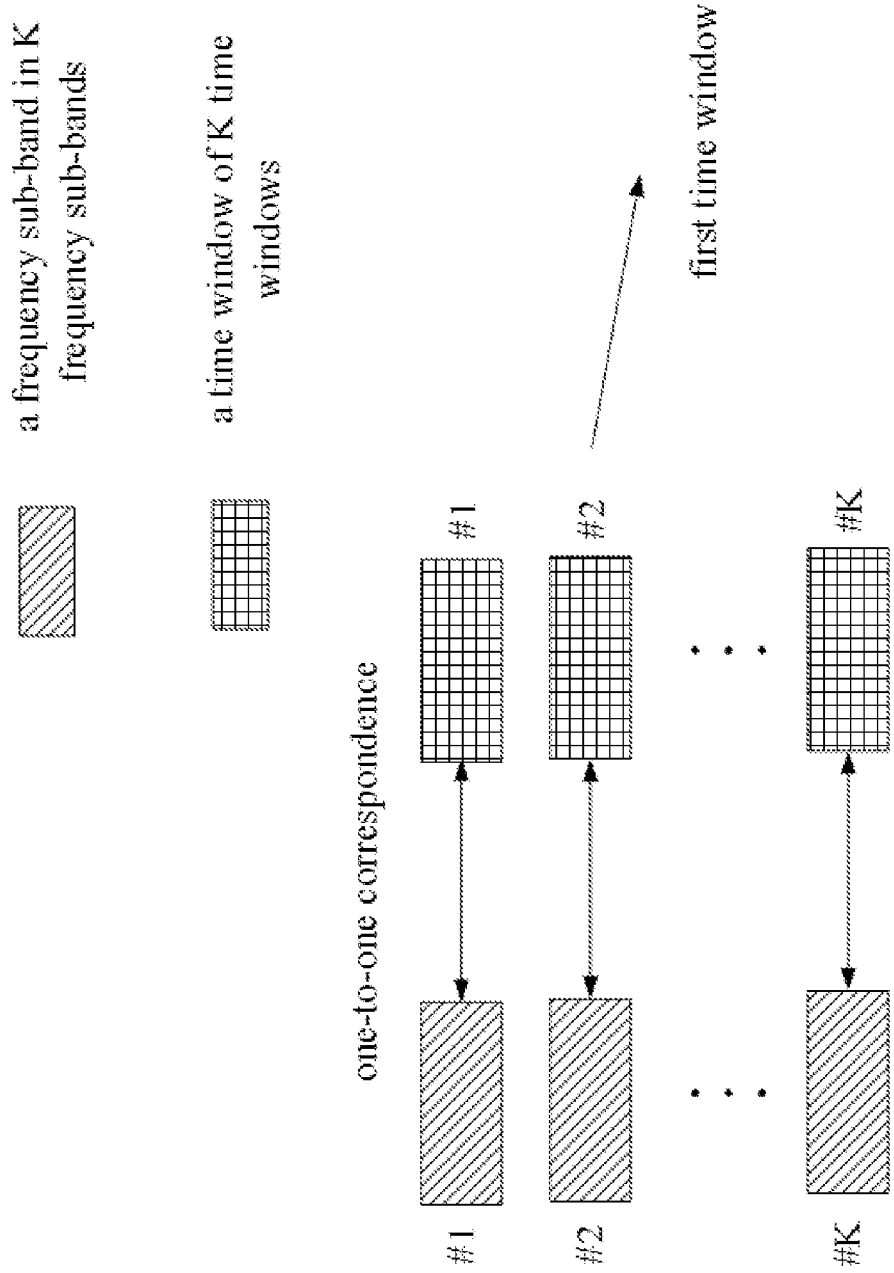

Embodiment 7A and Embodiment 7B respectively illustrate a schematic diagram of relationship between a first time window and K frequency sub-band(s), as shown in FIG. 7. In FIG. 7, index(indices) for the K frequency sub-band(s) is(are) #1 . . . , and #K, respectively.

In Embodiment 7A, the first time window corresponds to all of the K frequency sub-band(s).

In Embodiment 7B, the K frequency sub-band(s) corresponds(correspond) to K time window(s) respectively, the first time window is one time window of the K time window(s).

In one embodiment, the first time window corresponds to all of the K frequency sub-band(s).

In one subembodiment of the above embodiment, duration time for the first time window in time domain is a MCOT for the K frequency sub-band(s).

In one subembodiment of the above embodiment, the first time window is a MCOT for the K frequency sub-band(s).

In one subembodiment of the above embodiment, the first time window comprises a positive integer number of time unit(s) in time domain.

In one subembodiment of the above embodiment, a transmitter of the first information cannot occupy any frequency sub-band of the K frequency sub-band(s) after the first time window.

In one subembodiment of the above embodiment, a transmitter of the first information needs to determine through energy detection that the K frequency sub-band(s) is(are) not occupied after the first time window.

In one subembodiment of the above embodiment, a transmitter of the first information needs to determine through access detection that the K frequency sub-band(s) is(are) not occupied after the first time window; the access detection is LBT, or the access detection is CCA.

In one subembodiment of the above embodiment, a transmitter of the first information needs to determine through channel detection that the K frequency sub-band(s) is(are) not occupied after the first time window; the channel detection is LBT, or the channel detection is CCA.

In one embodiment, the K frequency sub-band(s) corresponds(correspond) to K time window(s) respectively, the first time window is a time window of the K time window(s); a given time window is any one time window of the K time window(s), a given frequency sub-band is a frequency sub-band corresponding to the given time window among the K frequency sub-band(s).

In one subembodiment of the above embodiment, the first frequency sub-band in the present disclosure belongs to the K frequency sub-band(s), the first time window is a time window corresponding to the first frequency sub-band in the present disclosure.

In one subembodiment of the above embodiment, the given time window is the second time window, the given frequency sub-band is the second frequency sub-band.

In one subembodiment of the above embodiment, duration time for the given time window in time domain is a MCOT for the given frequency sub-band.

In one subembodiment of the above embodiment, the given time window is a MCOT for the given frequency sub-band.

In one subembodiment of the above embodiment, the given time window comprises a positive integer number of consecutive time units in time domain.

In one subembodiment of the above embodiment, a transmitter of the first information cannot occupy the given frequency sub-band after the given time window.

In one subembodiment of the above embodiment, a transmitter of the first information needs to determine through energy detection that the given frequency sub-band is not occupied after the given time window.

In one subembodiment of the above embodiment, a transmitter of the first information needs to determine through access detection that the given frequency sub-band is not occupied after the given time window; the access detection is LBT, or the access detection is CCA.

In one subembodiment of the above embodiment, a transmitter of the first information needs to determine through channel detection that the given frequency sub-band is not occupied after the given time window; the channel detection is LBT, or the channel detection is CCA.

In one embodiment, the Embodiment 7A corresponds to a schematic diagram illustrating a relationship between the first time window and the K frequency sub-band(s) in which the first time window corresponds to all of the K frequency sub-band(s).

In one embodiment, the Embodiment 7B corresponds to a schematic diagram illustrating a relationship between the first time window and the K frequency sub-band(s) in which the K frequency sub-band(s) corresponds(correspond) to K time window(s) and the first time window is one time window of the K time window(s).

Embodiment 8

Figure 8:
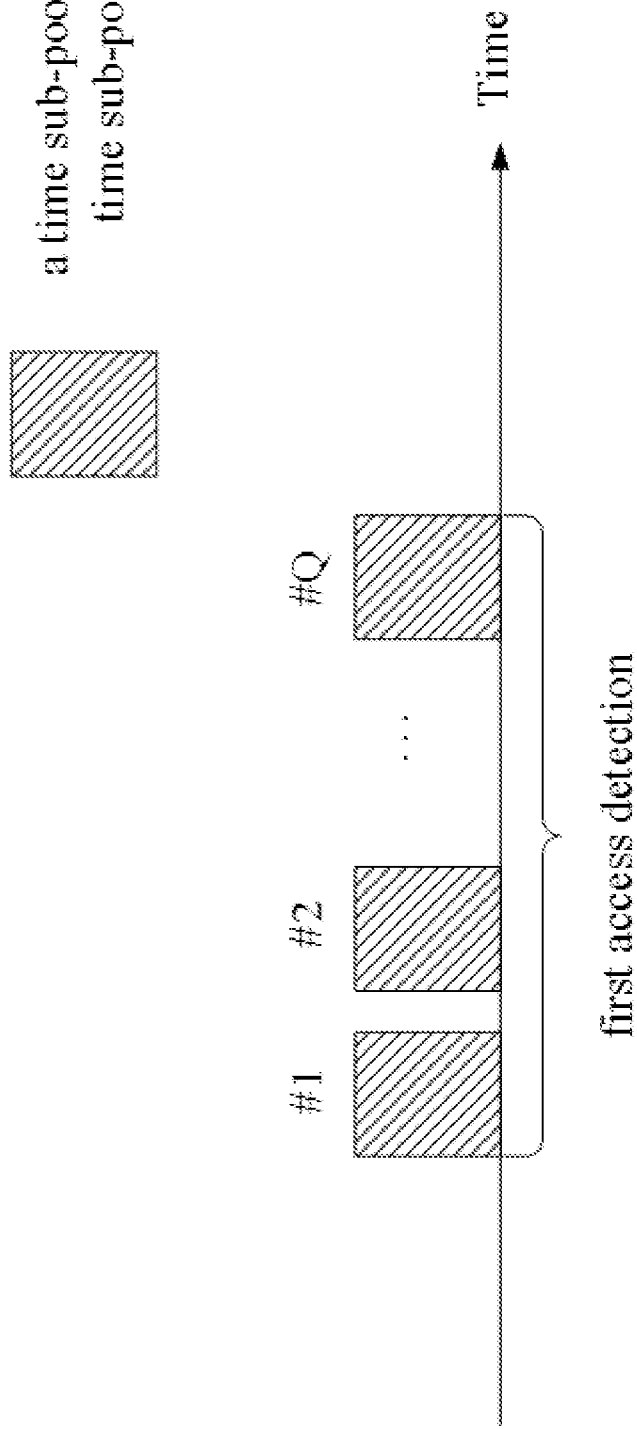
FIG. 8 illustrates a schematic diagram of a first access detection according to one embodiment of the present disclosure.

Embodiment 8 illustrates a schematic diagram of a first access detection, as shown in FIG. 8.

In Embodiment 8, the first access detection comprises performing Q energy detection(s) respectively in Q time sub-pool(s) of a first frequency band, and acquiring Q detection value(s), end time of the Q time sub-pool(s) is not later than start time for transmission of the first radio signal; the first frequency band comprises the first frequency sub-band; if each one of Q1 detection value(s) of the Q detection value(s) is lower than a first reference threshold, the first radio signal is transmitted in the first frequency sub-band; otherwise, transmission of the first radio signal is dropped in the first frequency sub-band; Q is a positive integer, Q1 is a positive integer not greater than the Q.

In one embodiment, the first access detection comprises initial CCA and only initial CCA within backoff duration.

In one subembodiment of the above embodiment, initial CCA in the first access detection comprises a positive integer number of defer duration(s).

In one subembodiment of the above embodiment, initial CCA in the first access detection comprises the Q time sub-pool(s).

In one subembodiment of the above embodiment, the Q1 detection value(s) corresponds(correspond) to Q1 time sub-pool(s) of initial CCA in the first access detection respectively.

In one embodiment, the first access detection comprises initial CCA and backoff duration.

In one subembodiment of the above embodiment, initial CCA in the first access detection comprises a positive integer number of defer duration(s).

In one subembodiment of the above embodiment, initial CCA in the first access detection comprises part of the Q time sub-pool(s).

In one subembodiment of the above embodiment, backoff duration in the first access detection comprises part of the Q time sub-pool(s).

In one subembodiment of the above embodiment, q detection value(s) of the Q1 detection values respectively corresponds(correspond) to q time sub-pool(s) of initial CCA in the first access detection, Q1-q detection value(s) of the Q1 detection values corresponds(correspond) to Q1-q time sub-pool(s) of backoff duration in the first access detection, q is a positive integer less than the Q1.

In one embodiment, the first frequency band comprises part or all of frequency sub-bands of the K frequency sub-bands.

In one embodiment, the first frequency band comprises only the first frequency sub-band of the K frequency sub-bands.

In one embodiment, the first frequency band comprises the K frequency sub-bands.

In one embodiment, the first frequency band further comprises at least one frequency sub-band other than the first frequency sub-band of the K frequency sub-bands.

Embodiment 9

Figure 9:
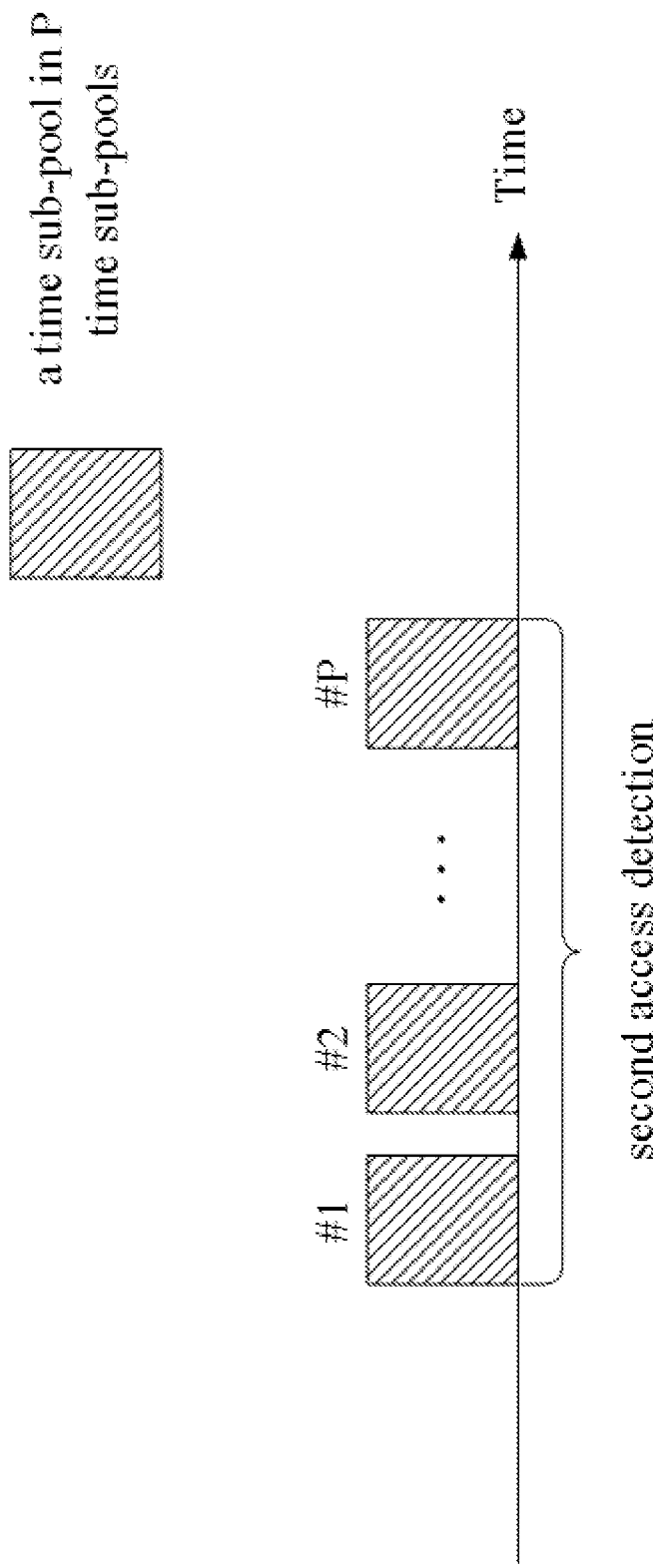
FIG. 9 illustrates a schematic diagram of a second access detection according to one embodiment of the present disclosure.

Embodiment 9 illustrates a schematic diagram of a second access detection, as shown in FIG. 9.

In Embodiment 9, the second access detection performing P energy detection(s) respectively in P time sub-pool(s) of a second frequency band, and acquiring P detection value(s), end time of the P time sub-pool(s) is not later than start time for transmission of the first radio signal; the second frequency band comprises the first frequency sub-band; if P1 detection value(s) of the P detection value(s) is lower than the first reference threshold, the first radio signal is transmitted in the first frequency sub-band; otherwise, transmission of the first radio signal is dropped in the first frequency sub-band; P is a positive integer, P1 is a positive integer not greater than the P, the P1 is greater than the Q1.

In one embodiment, the second access detection comprises initial CCA and backoff duration.

In one subembodiment of the above embodiment, initial CCA in the second access detection comprises a positive integer number of defer duration(s).

In one subembodiment of the above embodiment, initial CCA in the second access detection comprises part of the Q time sub-pool(s).

In one subembodiment of the above embodiment, backoff duration in the second access detection comprises part of the Q time sub-pool(s).

In one subembodiment of the above embodiment, p detection value(s) of the P1 detection values respectively corresponds(correspond) to p time sub-pool(s) of initial CCA in the second access detection, P1-p detection value(s) of the P1 detection values corresponds(correspond) to P1-p time sub-pool(s) of backoff duration in the second access detection, p is a positive integer less than the P1.

In one embodiment, the second frequency band does not comprise any one frequency sub-band of the K frequency sub-band(s).

In one embodiment, the second frequency band comprises part or all of frequency sub-bands of the K frequency sub-bands.

In one embodiment, the second frequency band comprises only the first frequency sub-band of the K frequency sub-bands.

In one embodiment, the second frequency band comprises the K frequency sub-bands.

In one embodiment, the second frequency band further comprises at least one frequency sub-band other than the first frequency sub-band of the K frequency sub-bands.

Embodiment 10

Figure 10:
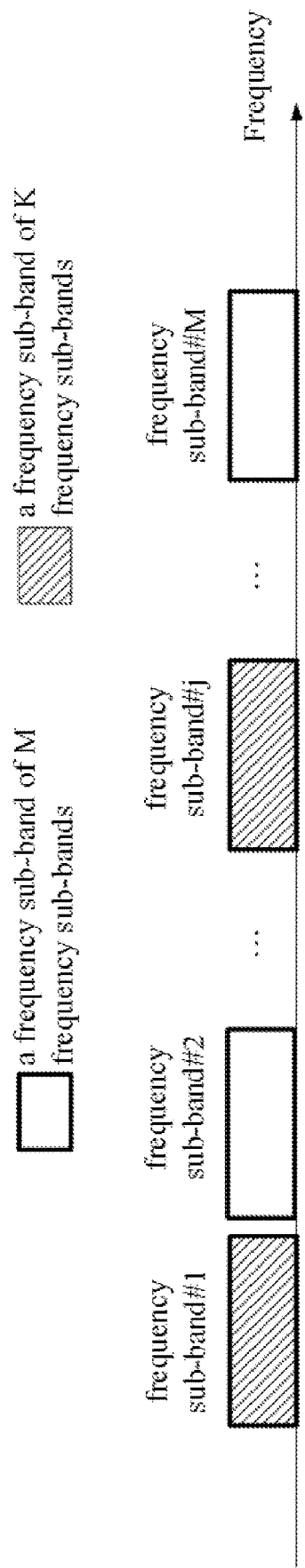
FIG. 10 illustrates a schematic diagram of K frequency sub-band(s) according to one embodiment of the present disclosure.

Embodiment 10 illustrates a schematic diagram of K frequency sub-band(s), as shown in FIG. 10.

In Embodiment 10, M frequency sub-band(s) comprises (comprise) the K frequency sub-band(s), the M frequency sub-band(s) is(are) predefined or configurable, M is a positive integer not less than K.

In one embodiment, any two of the M frequency sub-bands are orthogonal in frequency domain.

In one embodiment, any one frequency sub-band of the M frequency sub-band(s) is a CORESET.

In one embodiment, any one frequency sub-band of the M frequency sub-band(s) occupies a positive integer number of PRB(s).

In one embodiment, any one frequency sub-band of the M frequency sub-band(s) occupies a positive integer number of subcarrier(s) in frequency domain.

In one embodiment, any one frequency sub-band of the M frequency sub-band(s) belongs to unlicensed spectrum.

In one embodiment, any one frequency sub-band of the M frequency sub-band(s) is a BWP.

In one embodiment, any one frequency sub-band of the M frequency sub-band(s) is a CC.

In one embodiment, any one frequency sub-band of the M frequency sub-band(s) is a serving cell.

In one embodiment, any one frequency sub-band of the M frequency sub-band(s) is a sub-band.

In one embodiment, the M frequency sub-band(s) is(are) M sub-band(s) in a BWP, respectively.

In one embodiment, the M frequency sub-band(s) is(are) M BWP(s) in a CC, respectively.

In one embodiment, the M frequency sub-band(s) is(are) M sub-band(s) in a CC, respectively.

In one embodiment, the M frequency sub-band(s) is(are) M CC(s), respectively.

In one embodiment, the M frequency sub-band(s) is(are) pre-defined.

In one embodiment, bandwidth of any one frequency sub-band of the M frequency sub-band(s) is an integer number of times of 20 MHz.

In one embodiment, bandwidth of any one frequency sub-band of the M frequency sub-band(s) is 20 MHz.

In one embodiment, bandwidth of any one frequency sub-band of the M frequency sub-band(s) is 1 GHz.

In one embodiment, the M frequency sub-band(s) is(are) configurable.

In one embodiment, the M frequency sub-band(s) is(are) configurable, the above method comprises:

receiving third information;

wherein the third information is used for indicating the M frequency sub-band(s).

In one embodiment, the third information explicitly indicates the M frequency sub-band(s).

In one embodiment, the third information implicitly indicates the M frequency sub-band(s).

In one embodiment, the third information is semi-statically configured.

In one embodiment, the third information is carried by a higher-layer signaling.

In one embodiment, the third information is carried by an RRC signaling.

In one embodiment, the third information includes all or part of an IE in an RRC signaling.

In one embodiment, the third information includes part of an IE in an RRC signaling.

In one embodiment, the third information includes an IE or multiple IEs in an RRC signaling.

In one embodiment, the third information includes multiple IEs in an RRC signaling.

In one embodiment, the third information is carried by a MAC CE signaling.

In one embodiment, the third information is transmitted on a frequency band deployed on unlicensed spectrum.

In one embodiment, the third information is transmitted on a frequency band deployed on licensed spectrum.

In one embodiment, the third information is transmitted on the first frequency sub-band.

In one embodiment, the third information is transmitted on a frequency band other than the first frequency sub-band.

In one embodiment, the third information is transmitted on a frequency band deployed on licensed spectrum other than the first frequency sub-band.

In one embodiment, the third information is transmitted on a frequency band deployed on unlicensed spectrum other than the first frequency sub-band.

In one embodiment, the third information is transmitted on a frequency sub-band of the K frequency sub-band(s).

In one embodiment, the third information is transmitted on a frequency band other than the K frequency sub-band(s).

In one embodiment, the third information is transmitted on a frequency band deployed on licensed spectrum other than the K frequency sub-band(s).

In one embodiment, the third information is transmitted on a frequency band deployed on unlicensed spectrum other than the K frequency sub-band(s).

In one embodiment, the second information and the third information belong to two RRC signalings respectively.

In one embodiment, the second information and the third information belong to one same IE in an RRC signaling.

In one embodiment, the second information and the third information are a first domain and a second domain of an IE in an RRC signaling, respectively.

In one embodiment, the second information and the third information are two IEs in an RRC signaling, respectively.

Embodiment 11

Figure 11:
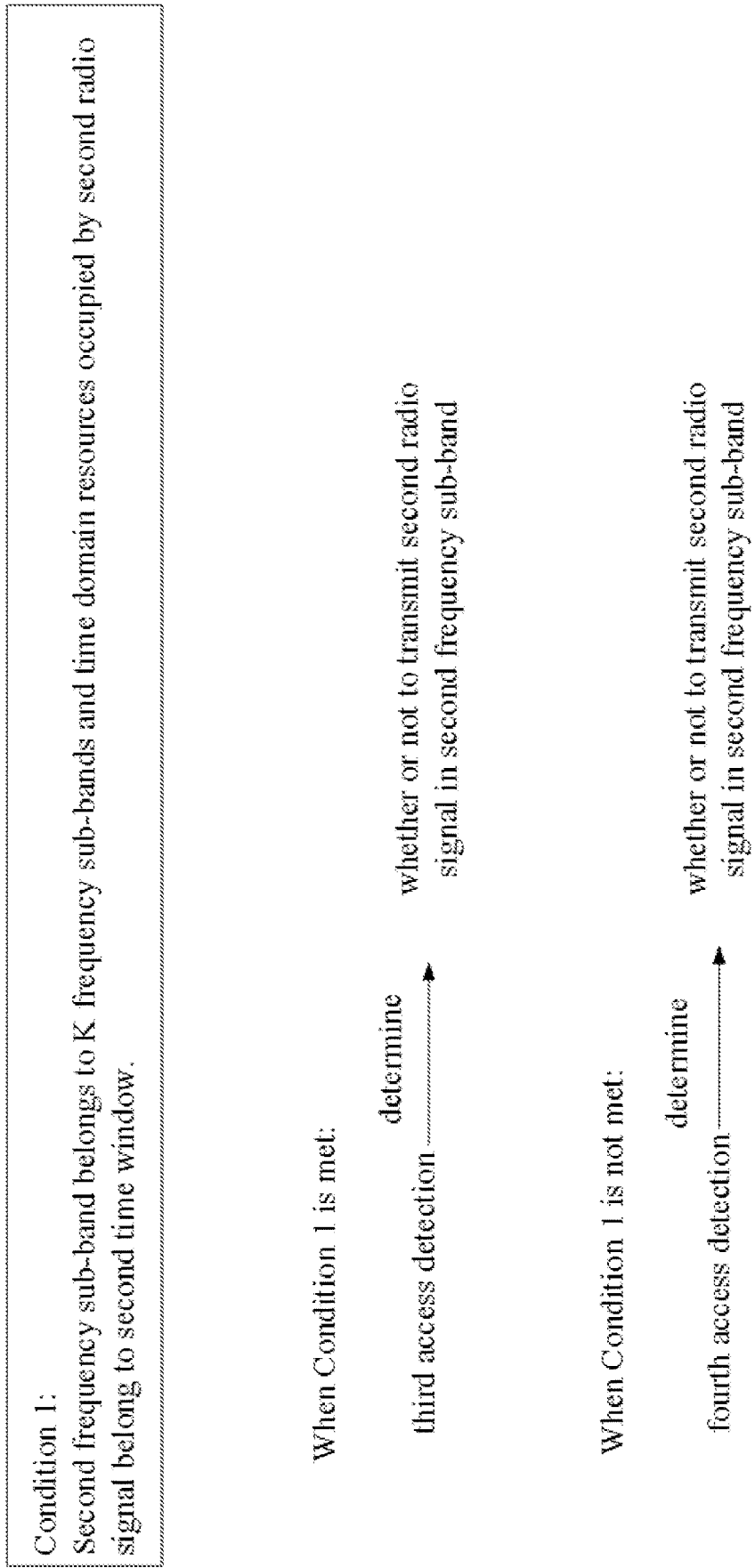
FIG. 11 illustrates a schematic diagram of determining whether a second radio signal is transmitted in a second frequency sub-band according to one embodiment of the present disclosure.

Embodiment 11 illustrates a schematic diagram of determining whether a second radio signal is transmitted in a second frequency sub-band, as shown in FIG. 11.

In Embodiment 11, the third access detection or the fourth access detection in the present disclosure is used for determining whether the second radio signal is transmitted in the second frequency sub-band. If the second frequency sub-band is one of the K frequency sub-band(s) in the present disclosure and time domain resources occupied by the second radio signal belong to a second time window, the third access detection is performed, the third access detection is used for determining whether the second radio signal is transmitted in the second frequency sub-band; otherwise, the fourth access detection is performed, the fourth access detection is used for determining whether the second radio signal is transmitted in the second frequency sub-band; detection time for the third access detection is less than that for the fourth access detection.

In one embodiment, the third access detection comprises performing G energy detection(s) respectively in G time sub-pool(s) of a third frequency band, and acquiring G detection value(s), end time of the G time sub-pool(s) is not later than start time for transmission of the second radio signal; the third frequency band comprises the second frequency sub-band; if G1 detection value(s) of the G detection value(s) is(are) lower than a first reference threshold, the second radio signal is transmitted in the second frequency sub-band; otherwise, transmission of the second radio signal is dropped in the second frequency sub-band; the G is a positive integer, the G1 is a positive integer not greater than the G.

In one embodiment, the third access detection comprises initial CCA and only the initial CCA within backoff duration.

In one subembodiment of the above embodiment, initial CCA in the third access detection comprises a positive integer number of defer duration(s).

In one subembodiment of the above embodiment, initial CCA in the third access detection comprises the G time sub-pool(s).

In one subembodiment of the above embodiment, the G1 detection value(s) corresponds(correspond) to G1 time sub-pool(s) of initial CCA in the third access detection.

In one embodiment, the third access detection comprises initial CCA and backoff duration.

In one subembodiment of the above embodiment, initial CCA in the third access detection comprises a positive integer number of defer duration(s).

In one subembodiment of the above embodiment, initial CCA in the third access detection comprises part time sub-pool(s) of the G time sub-pools.

In one subembodiment of the above embodiment, backoff duration in the third access detection comprises part time sub-pool(s) of the G time sub-pools.

In one subembodiment of the above embodiment, g detection value(s) of the G1 detection values respectively corresponds(correspond) to g time sub-pool(s) of initial CCA in the third access detection, G1-g detection value(s) of the G1 detection values corresponds(correspond) to G1-g time sub-pool(s) of backoff duration in the third access detection, the g is a positive integer less than the G1.

In one embodiment, the fourth access detection comprises performing H energy detections respectively in H time sub-pools of a third frequency band, and acquiring H detection values, end time of the H time sub-pools is not later than start time for transmission of the second radio signal; the fourth frequency band comprises the second frequency sub-band; if H1 detection values of the H detection values are lower than a first reference threshold, the second radio signal is transmitted in the second frequency sub-band; otherwise, transmission of the second radio signal is dropped in the second frequency sub-band; the H is a positive integer, the H1 is a positive integer not greater than the H, the H1 is greater than the G1.

In one embodiment, the fourth access detection comprises initial CCA and backoff duration.

In one subembodiment of the above embodiment, initial CCA in the fourth access detection comprises a positive integer number of defer duration(s).

In one subembodiment of the above embodiment, initial CCA in the fourth access detection comprises part time sub-pool(s) of the H time sub-pools.

In one subembodiment of the above embodiment, backoff duration in the fourth access detection comprises part time sub-pool(s) of the H time sub-pools In one subembodiment of the above embodiment, h detection value(s) of the H1 detection values respectively corresponds(correspond) to h time sub-pool(s) of initial CCA in the fourth access detection, H1-h detection value(s) of the H1 detection values corresponds(correspond) to H1-h time sub-pool(s) of backoff duration in the fourth access detection, the h is a positive integer less than the H1.

Embodiment 12

Figure 12:
FIG. 12 illustrates a schematic diagram of determining whether a second radio signal is transmitted in a second frequency sub-band according to another embodiment of the present disclosure.

Embodiment 12 illustrates a schematic diagram of determining whether a second radio signal is transmitted in a second frequency sub-band, as shown in FIG. 12.

In Embodiment 12, the first access detection or the second access detection in the present disclosure is further used for determining whether the second radio signal is transmitted in the second frequency sub-band, the first frequency band comprises the first frequency sub-band and the second frequency sub-band, the second frequency band comprises the first frequency sub-band and the second frequency sub-band.

In one embodiment, the first access detection is further used for determining whether the second radio signal is transmitted in the second frequency sub-band.

In one subembodiment of the above embodiment, the first frequency band comprises the first frequency sub-band and the second frequency sub-band.

In one subembodiment of the above embodiment, the first frequency band belongs to the K frequency sub-bands, and time domain resources occupied by the first radio signal and time domain resources occupied by the second radio signal all belong to the first time window.

In one subembodiment of the above embodiment, if the Q1 detection value(s) is(are) lower than the first reference threshold, the first radio signal is transmitted in the first frequency sub-band, and the second radio signal is transmitted in the second frequency sub-band; otherwise, transmission of the first radio signal in the first frequency sub-band is dropped, and transmission of the second radio signal in the second frequency sub-band is dropped.

In one embodiment, the second access detection is used for determining whether the second radio signal is transmitted in the second frequency sub-band.

In one subembodiment of the above embodiment, the first frequency sub-band is a frequency sub-band other than the K frequency sub-band(s); or, the first frequency sub-band is a frequency sub-band of the K frequency sub-band(s), time domain resources occupied by the first radio signal comprise time domain resources other than the first time window.

In one subembodiment of the above embodiment, the second frequency sub-band is a frequency sub-band other than the K frequency sub-band(s); or, the second frequency sub-band is a frequency sub-band of the K frequency sub-band(s), time domain resources occupied by the second radio signal comprise time domain resources other than the first time window.

In one subembodiment of the above embodiment, the second frequency band comprises the first frequency sub-band and the second frequency sub-band.

In one subembodiment of the above embodiment, if the P1 detection value(s) is(are) lower than the first reference threshold, the first radio signal is transmitted in the first frequency sub-band, and the second radio signal is transmitted in the second frequency sub-band; otherwise, transmission of the first radio signal in the first frequency sub-band is dropped, and transmission of the second radio signal in the second frequency sub-band is dropped.

Embodiment 13

Figure 13:
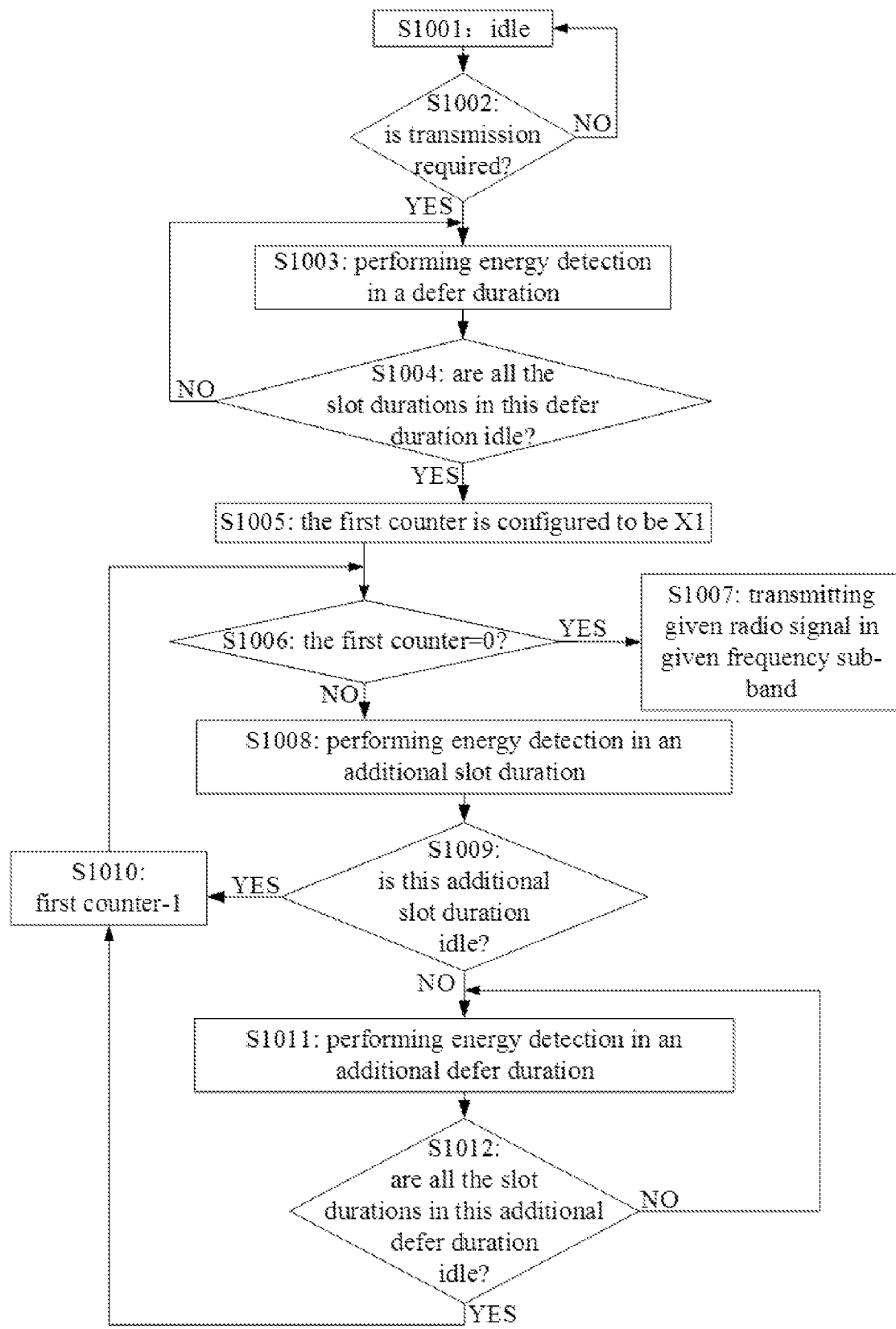
FIG. 13 illustrates a schematic diagram illustrating a given access detection being used for determining whether a given radio signal is transmitted in a given frequency sub-band according to one embodiment of the present disclosure.

Embodiment 13 illustrates a schematic diagram illustrating a given access detection being used for determining whether a given radio signal is transmitted in a given frequency sub-band, as shown in FIG. 13.

In Embodiment 13, the given access detection comprises performing X energy detection(s) respectively in X time sub-pool(s) of a given frequency sub-band, and acquiring X detection value(s), the X is a positive integer; end time of the X time sub-pool(s) is not later than a given time, the given time is start time for transmission of the given radio signal; if Z detection value(s) of the X detection value(s) is(are) lower than the first reference threshold in the present disclosure, the given radio signal is transmitted in the given frequency sub-band; otherwise, transmission of the given radio signal in the given frequency sub-band is dropped; the Z is a positive integer not greater than the X. The given access detection corresponds to the first access detection in the present disclosure, the given frequency sub-band corresponds to the first frequency band in the present disclosure, the given radio signal corresponds to the first radio signal in the present disclosure, the X corresponds to the Q in the present disclosure, the Z is equal to the Q1 in the present disclosure; or, the given access detection corresponds to the second access detection in the present disclosure, the given frequency sub-band corresponds to the second frequency band in the present disclosure, the given radio signal corresponds to the first radio signal in the present disclosure, the X corresponds to the P in the present disclosure, the Z is equal to the P1 in the present disclosure; or, the given access detection corresponds to the third access detection in the present disclosure, the given frequency sub-band corresponds to the third frequency band in the present disclosure, the given radio signal corresponds to the second radio signal in the present disclosure, the X corresponds to the G in the present disclosure, the Z is equal to the G1 in the present disclosure; or, the given access detection corresponds to the fourth access detection in the present disclosure, the given frequency sub-band corresponds to the fourth frequency band in the present disclosure, the given radio signal corresponds to the second radio signal in the present disclosure, the X corresponds to the H in the present disclosure, the Z is equal to the H1 in the present disclosure; or, the given access detection corresponds to any access detection of the K access detection(s) in the present disclosure, the given frequency sub-band is a frequency sub-band corresponding to the given access detection of the K frequency sub-band(s) in the present disclosure, the given radio signal is a radio signal carrying the first information in the present disclosure; or, the given access detection corresponds to any access detection of the M access detection(s) in the present disclosure, the given frequency sub-band is a frequency sub-band corresponding to the given access detection of the M frequency sub-band(s) in the present disclosure, the given radio signal is a radio signal carrying the first information in the present disclosure. Processes of the given access detection can be described by the diagram in FIG. 13.

In FIG. 13, the status is idle in step S1001, determine whether transmission is needed in step S1002; perform energy detection within a defer duration in step S1003; determine whether all slot durations within the defer duration are idle in step 1004, if these slot durations are idle, move on to step S1005 to configure a first counter as X1, the X1 is a non-negative integer not greater than the X; otherwise, move back to step S1004; determine whether the first counter is 0 in step S1006, if the first counter is 0, move on to step S1007 to transmit the given radio signal in the given frequency sub-band; otherwise, move on to step S1008 to perform energy detection within an additional slot duration; determine whether the additional slot duration is idle in step S1009, if the additional slot duration is idle, move on to step S1010 to reduce the first counter by 1, and then move back to step S1006; otherwise, move on to step S1011 to perform energy detection within an additional defer duration; determine whether all slot durations within the additional defer duration are idle in step S1012, if these slot durations are idle, move on to step S1010; otherwise, move back to step S1011.

In Embodiment 13, the given access detection corresponds to the first access detection in the present disclosure, the X1 is equal to 0 or the X1 is greater than 0; or, the given access detection corresponds to the second access detection in the present disclosure, the X1 is greater than 0; or, the given access detection corresponds to the third access detection in the present disclosure, the X1 is equal to 0 or the X1 is greater than 0; or, the given access detection corresponds to the fourth access detection in the present disclosure, the X1 is greater than 0.

In Embodiment 13, a first given duration comprises a positive integer number of time sub-pool(s) of the X time sub-pool(s), the first given duration is any duration of all defer durations comprised in FIG. 13. A second given duration comprises Y1 time sub-pool(s) of the X time sub-pool(s) corresponding to the Z detection value(s), the second given duration is a deter duration in FIG. 13 within which all slot durations are determined to be idle through energy detection. The first counter in FIG. 13 is cleared to 0 before the given time, a result of the given access detection is that a channel is idle, the given radio signal can be transmitted in the given frequency sub-band; otherwise, the given radio signal cannot be transmitted in the given frequency sub-band. A condition for clearing the first counter is that the X1 is equal to 0, or the X1 is greater than 0 and X1 detection value(s) of the X detection value(s) corresponding to X1 time sub-pool(s) of the X time sub-pool(s) is(are) lower than the first reference threshold in the present disclosure, start time for the X1 time sub-pool(s) is after step S1005 in FIG. 13. Z time sub-pool(s) consists(consist) of the Y1 time sub-pool(s) and the X1 time sub-pool(s), the Z time sub-pool(s) corresponds(correspond) to the Z detection value(s) respectively, the Z is a sum of the X1 and the Y1.

In one embodiment, detection time for the given access detection is a sum of time occupied by the Z time sub-pool(s).

In one embodiment, detection time for the given access detection is a sum of time occupied by the X time sub-pool(s).

In one embodiment, detection time for the given access detection is a sum of time occupied by the part time sub-pool(s) of the X time sub-pool(s).

In one embodiment, the X time sub-pool(s) comprises (comprise) all defer durations in FIG. 13.

In one embodiment, the X time sub-pool(s) comprises (comprise) part of defer durations in FIG. 13.

In one embodiment, the X time sub-pool(s) comprises (comprise) all defer durations and all additional slot durations in FIG. 13.

In one embodiment, the X time sub-pool(s) comprises (comprise) all defer durations and part of additional slot durations in FIG. 13.

In one embodiment, the X time sub-pool(s) comprises (comprise) all defer durations, all additional slot durations and all additional defer durations in FIG. 13.

In one embodiment, the X time sub-pool(s) comprises (comprise) all defer durations, part of additional slot durations and all additional defer durations in FIG. 13.

In one embodiment, the X time sub-pool(s) comprises (comprise) all defer durations, part of additional slot durations and part of additional defer durations in FIG. 13.

In one embodiment, duration time for any time sub-pool of the X time sub-pool(s) is one of 16 ms and 9 ms.

In one embodiment, any slot duration within a given time duration is a time sub-pool of the X time sub-pool(s); the given time duration is any duration of all defer durations, all additional slot durations, and all additional defer durations comprised in FIG. 13.

In one embodiment, performing energy detection in a given time duration refers to: performing energy detection in all slot durations within the given time duration; the given time duration is any time duration of all defer durations, all additional slot durations, and all additional defer durations comprised in FIG. 13.

In one embodiment, a given time duration being determined to be idle via energy detection refers to: all slot durations comprised in the given time duration are determined to be idle through energy detection; the given time duration is any time duration of all defer durations, all additional slot durations, and all additional defer durations comprised in FIG. 13.

In one embodiment, a given slot duration being determined to be idle via energy detection refers to: sensing power values of all radio signals on the given frequency sub-band in a given time unit, and averaging these power values in time, and a receiving power acquired is lower than the first reference threshold; the given time unit is a time duration within the given slot duration.

In one subembodiment of the above embodiment, duration time for the given time unit is not less than 4 ms.

In one embodiment, a given slot duration being determined to be idle via energy detection refers to: sensing energies of all radio signals on the given frequency sub-band in a given time unit, and averaging these energies in time, and a receiving energy acquired is lower than the first reference threshold; the given time unit is a time duration within the given slot duration.

In one subembodiment of the above embodiment, duration time for the given time unit is not less than 4 ms.

In one embodiment, performing energy detection in a given time duration refers to: performing energy detection in all time sub-pool(s) within the given time duration; the given time duration is any time duration of all defer durations, all additional slot durations, and all additional defer durations comprised in FIG. 13, the all time sub-pool(s) belong to the X time sub-pool(s).

In one embodiment, a given time duration being determined to be idle via energy detection refers to: detection value(s) acquired through energy detection on all time sub-pool(s) comprised in the given time duration is(are) lower than the first reference threshold; the given time duration is any time duration of all defer durations, all additional slot durations, and all additional defer durations comprised in FIG. 13, the all time sub-pool(s) belongs(belong) to the X time sub-pool(s), and the detection value(s) belongs(belong) to the X detection value(s).

In one embodiment, duration time for a defer duration is 16 ms plus Y1-1 time(s) of 9 ms.

In one subembodiment of the above embodiment, a defer duration comprises Y1 time sub-pool(s) of the X time sub-pool(s).

In one reference embodiment of the above sub-embodiment, duration time for a first time sub-pool of the Y1 time sub-pools is 16 ms, duration time for other Y1-1 time sub-pool(s) is 9 ms.

In one subembodiment of the above embodiment, a given priority class is used for determining the Y1.

In one reference embodiment of the above sub-embodiment, the given priority class is Channel Access Priority Class. The specific meaning of the Channel Access Priority Class can be found in 3GPP Technical Specification (TS) 36.213, chapter 15.

In one subembodiment of the above embodiment, a given priority class is used for determining the Y1-1.

In one reference embodiment of the above sub-embodiment, the given priority class is Channel Access Priority Class. The specific meaning of the Channel Access Priority Class can be found in 3GPP TS 36.213, chapter 15.

In one subembodiment of the above embodiment, the Y1-1 belongs to 1, 2, 3 and 7.

In one subembodiment of the above embodiment, the Y1 belongs to 2, 3, 4 and 8.

In one embodiment, a defer duration comprises Y1 slot durations.

In one subembodiment of the above embodiment, the Y1 is greater than 1, a first slot duration and a second slot duration of the Y1 slot durations are not consecutive.

In one subembodiment of the above embodiment, the Y1 is greater than 1, a first slot duration and a second slot duration of the Y1 slot durations are spaced by a time interval of 7 ms.

In one embodiment, duration time for an additional defer duration is 16 ms plus Y2-1 time(s) of 9 ms, the Y2 is a positive integer.

In one subembodiment of the above embodiment, an additional defer duration comprises Y2 time sub-pool(s) of the X time sub-pool(s).

In one reference embodiment of the above sub-embodiment, duration time for a first time sub-pool of the Y2 time sub-pools is 16 ms, duration time for other Y2-1 time sub-pool(s) is 9 ms.

In one subembodiment of the above embodiment, a given priority class is used for determining the Y2.

In one reference embodiment of the above sub-embodiment, the given priority class is Channel Access Priority Class. The specific meaning of the Channel Access Priority Class can be found in 3GPP Technical Specification (TS) 36.213, chapter 15.

In one subembodiment of the above embodiment, a given priority class is used for determining the Y2-1.

In one reference embodiment of the above sub-embodiment, the given priority class is Channel Access Priority Class. The specific meaning of the Channel Access Priority Class can be found in 3GPP TS 36.213, chapter 15.

In one subembodiment of the above embodiment, the Y2-1 belongs to 1, 2, 3 and 7.

In one subembodiment of the above embodiment, the Y2 belongs to 2, 3, 4 and 8.

In one subembodiment of the above embodiment, the Y2 is equal to the Y1.

In one subembodiment of the above embodiment, the Y2 is not equal to the Y1.

In one embodiment, an additional defer duration comprises Y2 slot durations, the Y2 is a positive integer.

In one subembodiment of the above embodiment, the Y2 is greater than 1, a first slot duration and a second slot duration of the Y2 slot durations are not consecutive.

In one subembodiment of the above embodiment, the Y2 is greater than 1, a first slot duration and a second slot duration of the Y2 slot durations are spaced by a time interval of 7 ms.

In one embodiment, duration time for a slot duration is 9 ms.

In one embodiment, a slot duration is a time sub-pool of the X time sub-pool(s).

In one embodiment, a slot duration belongs to a time sub-pool of the X time sub-pool(s).

In one embodiment, duration time for an additional slot duration is 9 ms.

In one embodiment, an additional slot duration is a time sub-pool of the X time sub-pool(s).

In one embodiment, an additional slot duration belongs to a time sub-pool of the X time sub-pool(s).

In one embodiment, the X energy detection(s) is(are) used for determining whether the given frequency sub-band is idle.

In one embodiment, the X energy detection(s) is(are) used for determining whether the given frequency sub-band can be used for transmitting the given radio signal.

In one embodiment, unit for the X detection value(s) is dBm.

In one embodiment, unit for the X detection value(s) is mW.

In one embodiment, unit for the X detection value(s) is joule.

In one embodiment, the X1 is less than the X.
In one embodiment, the Y1 is less than the X.
In one embodiment, the X is equal to 1.
In one embodiment, the X is greater than 1.
In one embodiment, the X1 is equal to 0.
In one embodiment, the X1 is greater than 0.
In one embodiment, the Y1 is equal to 2.
In one embodiment, the Y1 is greater than 1.

In one embodiment, unit for the first reference threshold is dBm.

In one embodiment, unit for the first reference threshold is mW.

In one embodiment, unit for the first reference threshold is joule.

In one embodiment, the first reference threshold is equal to or less than −72 dBm.

In one embodiment, the first reference threshold is any value equal to or less than a first given value.

In one subembodiment of the above embodiment, the first given value is pre-defined.

In one subembodiment of the above embodiment, the first given value is configured by a higher-layer signaling.

In one embodiment, the first reference threshold is arbitrarily chosen when is equal to or less than a first given value.

In one subembodiment of the above embodiment, the first given value is predefined.

In one subembodiment of the above embodiment, the first given value is configured by a higher-layer signaling.

In one embodiment, the X1 is greater than 0, the X energy detection(s) is(are) energy detection(s) performed in a Cat 4 LBT process, the X1 is a CWp in the Cat 4 LBT process, the CWp is a size of Contention Window (CW). The specific meaning of the CWp can be found in 3GPP TS 36.213, chapter 15.

In one embodiment, at least one detection value among detection values of the X detection values and not belonging to the X1 detection value(s) is lower than the first reference threshold.

In one embodiment, at least one detection value among detection values of the X detection values and not belonging to the X1 detection value(s) is not lower than the first reference threshold.

In one embodiment, any two time sub-pools of the X1 time sub-pools have equal duration time.

In one embodiment, at least two time sub-pools of the X1 time sub-pools have different duration time.

In one embodiment, the X1 time sub-pool(s) comprises (comprise) a latest time sub-pool of the X time sub-pools.

In one embodiment, the X1 time sub-pool(s) only comprises(comprise) slot durations in CCA.

In one embodiment, the X1 time sub-pools comprise X1 time sub-pool(s) and X2 time sub-pool(s), any time sub-pool of the X2 time sub-pool(s) does not belong to the X1 time sub-pool(s); the X2 is a positive integer not greater than a difference between the X and the X1.

In one subembodiment of the above embodiment, the X2 time sub-pool(s) comprises(comprise) slot durations within initial CCA.

In one subembodiment of the above embodiment, the X2 time sub-pool(s) comprises(comprise) the Y1 time sub-pool(s).

In one subembodiment of the above embodiment, positions of the X2 time sub-pools in the X time sub-pools are consecutive.

In one subembodiment of the above embodiment, at least one time sub-pool of the X2 time sub-pool(s) corresponds to a detection value lower than the first reference threshold.

In one subembodiment of the above embodiment, at least two time sub-pool of the X2 time sub-pools correspond to detection values lower than the first reference threshold.

In one subembodiment of the above embodiment, at least one time sub-pool of the X2 time sub-pool(s) corresponds to a detection value not lower than the first reference threshold.

In one subembodiment of the above embodiment, the X2 time sub-pool(s) comprises(comprise) all slot durations within all defer durations.

In one subembodiment of the above embodiment, the X2 time sub-pool(s) comprises(comprise) all slot durations within at least one additional defer duration.

In one subembodiment of the above embodiment, the X2 time sub-pool(s) comprises(comprise) at least one additional slot duration.

In one subembodiment of the above embodiment, the X2 time sub-pool(s) comprises(comprise) all additional slot durations and all slot durations within all additional defer durations determined to be non-idle through energy detection in FIG. 13.

In one embodiment, the X1 time sub-pool(s) belongs (belong) to X1 sub-pool set(s) respectively, any sub-pool set of the X1 sub-pool set(s) comprises a positive integer number of time sub-pool(s) of the X time sub-pool(s); a detection value corresponding to any time sub-pool is lower than the first reference threshold.

In one subembodiment of the above embodiment, number of time sub-pool(s) comprised in at least one sub-pool set of the X1 sub-pool set(s) is equal to 1.

In one subembodiment of the above embodiment, number of time sub-pool(s) comprised in at least one sub-pool set of the X1 sub-pool set(s) is greater than 1.

In one subembodiment of the above embodiment, there are at least two sub-pool sets of the X1 sub-pool sets comprising different numbers of time sub-pools.

In one subembodiment of the above embodiment, there does not exist a time sub-pool of the X time sub-pools that belongs to two sub-pool sets of the X1 sub-pool sets simultaneously.

In one subembodiment of the above embodiment, all time sub-pools in any sub-pool set of the X1 sub-pool set(s) belong to a same additional defer duration or additional slot duration determined to be idle through energy detection.

In one subembodiment of the above embodiment, at least one time sub-pool of time sub-pools of the X time sub-pools and not belonging to the X1 sub-pool set(s) corresponds to a detection value lower than the first reference threshold.

In one subembodiment of the above embodiment, at least one time sub-pool of time sub-pools of the X time sub-pools and not belonging to the X1 sub-pool set(s) corresponds to a detection value not lower than the first reference threshold.

Embodiment 14

Figure 14:
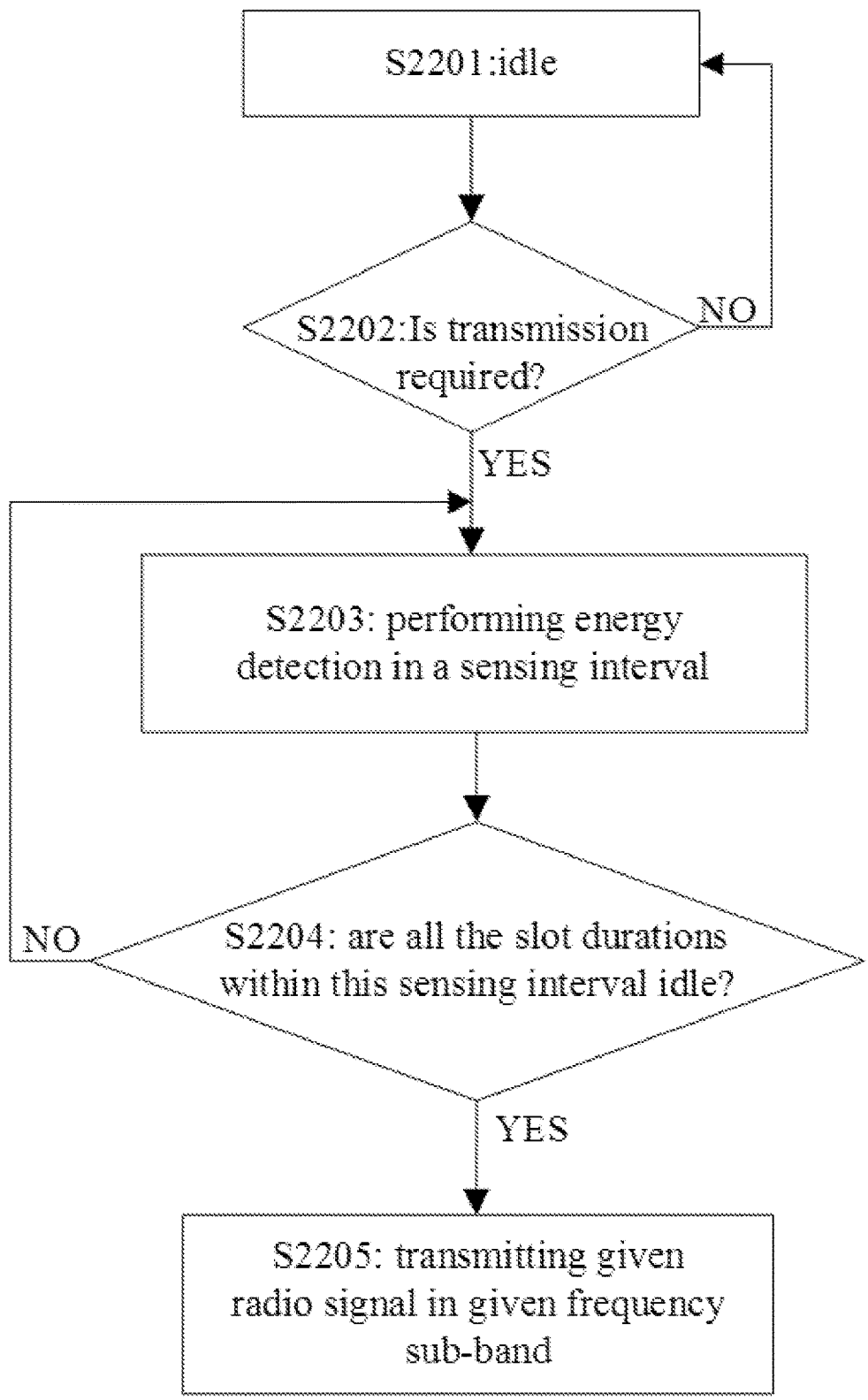
FIG. 14 illustrates a schematic diagram illustrating a given access detection being used for determining whether a given radio signal is transmitted in a given frequency sub-band according to another embodiment of the present disclosure.

Embodiment 14 illustrates another schematic diagram illustrating a given access detection being used for determining whether a given radio signal is transmitted in a given frequency sub-band, as shown in FIG. 14.

In Embodiment 14, the given access detection comprises performing x energy detection(s) respectively in x time sub-pool(s) of a given frequency sub-band, and acquiring x detection value(s), the x is a positive integer; end time of the x time sub-pool(s) is not later than a given time, the given time is start time for transmission of the given radio signal; if z detection value(s) of the x detection value(s) is(are) lower than the first reference threshold in the present disclosure, the given radio signal is transmitted in the given frequency sub-band; otherwise, transmission of the given radio signal in the given frequency sub-band is dropped; the z is a positive integer not greater than the x. The given access detection corresponds to the first access detection in the present disclosure, the given frequency sub-band corresponds to the first frequency band in the present disclosure, the given radio signal corresponds to the first radio signal in the present disclosure, the x corresponds to the Q in the present disclosure, the z is equal to the Q1 in the present disclosure; or, the given access detection corresponds to the third access detection in the present disclosure, the given frequency sub-band corresponds to the third frequency band in the present disclosure, the given radio signal corresponds to the second radio signal in the present disclosure, the x corresponds to the G in the present disclosure, the z is equal to the G1 in the present disclosure. Processes of the given access detection can be described by the diagram in FIG. 14.

In Embodiment 14, the status is idle in step S2201; determine whether transmission is needed in step S2202; perform energy detection within a sensing interval in step S2203; determine whether all slot durations within the sensing interval are idle in step S2204, if these slot durations are idle, move on to step S2205 to transmit the given radio signal in the given frequency sub-band; otherwise, move back to step S2203.

In Embodiment 14, a third given duration comprises a positive integer number of time sub-pool(s) of the x time sub-pool(s), the third given duration is any duration of all sensing intervals comprised in FIG. 14. A fourth given duration comprises z time sub-pool(s) of the x time sub-pool(s) corresponding to the z detection value(s), the fourth duration is a sensing interval in FIG. 14 within which all slot durations are determined to be idle through energy detection.

In one embodiment, detection time for the given access detection is a sum of time occupied by the z time sub-pool(s).

In one embodiment, detection time for the given access detection is a sum of time occupied by the x time sub-pool(s).

In one embodiment, detection time for the given access detection is a sum of time occupied by part of the x time sub-pool(s).

In one embodiment, the specific meaning of the sensing interval can be found in 3GPP TS 36.213, chapter 15.2.

In one embodiment, the z is equal to 2.

In one embodiment, the z is greater than 1.

In one embodiment, the z is equal to the x.

In one embodiment, duration time for a sensing interval is 25 ms.

In one embodiment, a sensing interval comprises two slot durations, the two slot durations are not consecutive in time domain.

In one subembodiment of the above embodiment, a time interval between the two slot durations is 7 ms.

In one embodiment, the x time sub-pool(s) comprises (comprise) monitoring time in LBT Cat 2.

In one embodiment, the x time sub-pool(s) comprises (comprise) slots of a sensing interval in Type 2 UL channel access procedure, the specific meaning of the sensing interval can be found in 3GPP TS 36.213, chapter 15.2.

In one subembodiment of the above embodiment, duration time for the sensing interval is 25 ms.

In one embodiment, the x time sub-pool(s) comprises (comprise) Tf and Tsl of a sensing interval in Type 2 UL channel access procedure, the specific meaning of the Tf and Tsl can be found in 3GPP TS 36.213, chapter 15.2.

In one subembodiment of the above embodiment, duration time for the Tf is 16 ms.

In one subembodiment of the above embodiment, duration time for the Tsl is 9 ms.

In one embodiment, duration time for a first time sub-pool of the z time sub-pools is 16 ms, duration time for a second time sub-pool of the z time sub-pools is 9 ms, the z is equal to 2.

In one embodiment, duration time for each of the z time sub-pools is 9 ms; a first time sub-pool and a second time sub-pool of the z time sub-pools are spaced by a time interval of 7 ms, the z is equal to 2.

Embodiment 15

Figure 15:
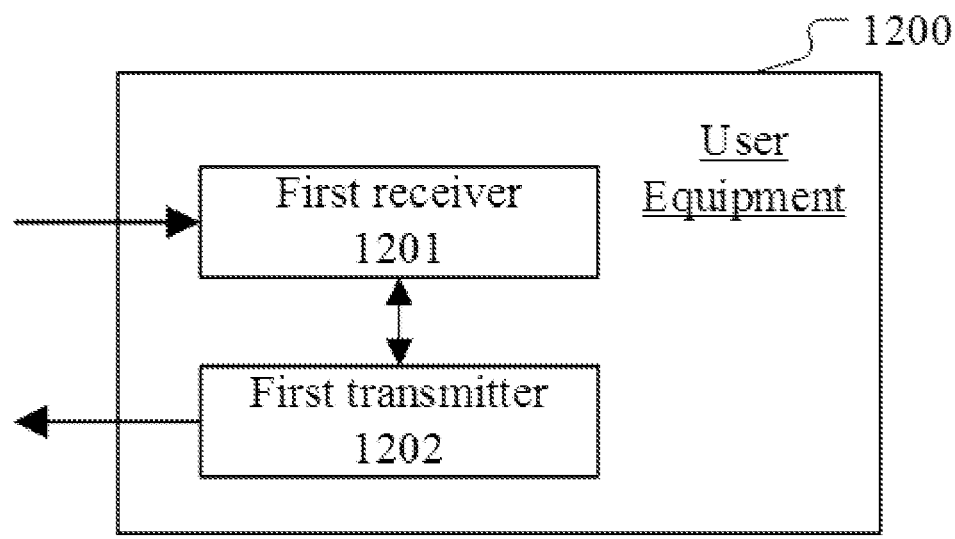
FIG. 15 illustrates a structure block diagram of a processing device in a UE according to one embodiment of the present disclosure.

Embodiment 15 illustrates a structure block diagram of a processing device in a UE, as shown in FIG. 15. In FIG. 15, a UE processing device 1200 mainly consists of a first receiver 1201 and a first transmitter 1202.

In one embodiment, the first receiver 1201 comprises a receiver 456, a receiving processor 452 and a controller/processor 490 in Embodiment 4.

In one embodiment, the first receiver 1201 comprises at least the former two of a receiver 456, a receiving processor 452 and a controller/processor 490 in Embodiment 4.

In one embodiment, the first transmitter 1202 comprises a transmitter 456, a transmitting processor 455 and a controller/processor 490 in Embodiment 4.

In one embodiment, the first transmitter 1202 comprises at least the former two of a transmitter 456, a transmitting processor 455 and a controller/processor 490 in Embodiment 4.

A first receiver 1201 receives first information, the first information is used for indicating K frequency sub-band(s), K is a positive integer; and performs a first access detection, or performs a second access detection;

A first transmitter 1202 transmits a first radio signal in a first frequency sub-band, or drops transmission of the first radio signal in the first frequency sub-band.

In Embodiment 15, the first frequency sub-band comprises frequency domain resources occupied by the first radio signal; if the first frequency sub-band belongs to the K frequency sub-band(s) and time domain resources occupied by the first radio signal belong to a first time window, the first access detection is performed, the first access detection is used for determining whether the first radio signal is transmitted in the first frequency sub-band; otherwise, the second access detection is performed, the second access detection is used for determining whether the first radio signal is transmitted in the first frequency sub-band; detection time for the first access detection is less than that for the second access detection.

In one embodiment, the first access detection comprises performing Q energy detection(s) respectively in Q time sub-pool(s) of a first frequency band, and acquiring Q detection value(s), end time of the Q time sub-pool(s) is not later than start time for transmission of the first radio signal; the first frequency band comprises the first frequency sub-band; if each one of Q1 detection value(s) of the Q detection value(s) is lower than a first reference threshold, the first radio signal is transmitted in the first frequency sub-band; otherwise, transmission of the first radio signal is dropped in the first frequency sub-band; Q is a positive integer, Q1 is a positive integer not greater than the Q.

In one embodiment, the second access detection comprises performing P energy detection(s) respectively in P time sub-pool(s) of a second frequency band, and acquiring P detection value(s), end time of the P time sub-pool(s) is not later than start time for transmission of the first radio signal; the second frequency band comprises the first frequency sub-band; if P1 detection value(s) of the P detection value(s) is lower than the first reference threshold, the first radio signal is transmitted in the first frequency sub-band; otherwise, transmission of the first radio signal is dropped in the first frequency sub-band; P is a positive integer, P1 is a positive integer not greater than the P, the P1 is greater than the Q1.

In one embodiment, the first receiver 1201 further receives second information; wherein the second information is used for determining at least one of the frequency domain resources occupied by the first radio signal and the time domain resources occupied by the first radio signal.

In one embodiment, M frequency sub-band(s) comprises (comprise) the K frequency sub-band(s), the M frequency sub-band(s) are predefined or configurable, M is a positive integer not less than K.

In one embodiment, the first transmitter 1202 further transmits a second radio signal in a second frequency sub-band, or drops transmission of the second radio signal in the second frequency sub-band; wherein the second frequency sub-band comprises frequency domain resources occupied by the second radio signal, start time for transmission of the first radio signal and that of the second radio signal are the same, the first frequency sub-band and the second frequency sub-band are orthogonal in frequency domain.

In one embodiment, the first receiver 1201 further performs a third access detection, or performs a fourth access detection; wherein if the second frequency sub-band belongs to the K frequency sub-band(s) and time domain resources occupied by the second radio signal belong to a second time window, the third access detection is performed, the third access detection is used for determining whether the second radio signal is transmitted in the second frequency sub-band; otherwise, the fourth access detection is performed, the fourth access detection is used for determining whether the second radio signal is transmitted in the second frequency sub-band; detection time for the third access detection is less than that for the fourth access detection.

In one embodiment, the first access detection or the second access detection is further used for determining whether the second radio signal is transmitted in the second frequency sub-band, the first frequency band comprises the first frequency sub-band and the second frequency sub-band, the second frequency band comprises the first frequency sub-band and the second frequency sub-band.

Embodiment 16

Figure 16:
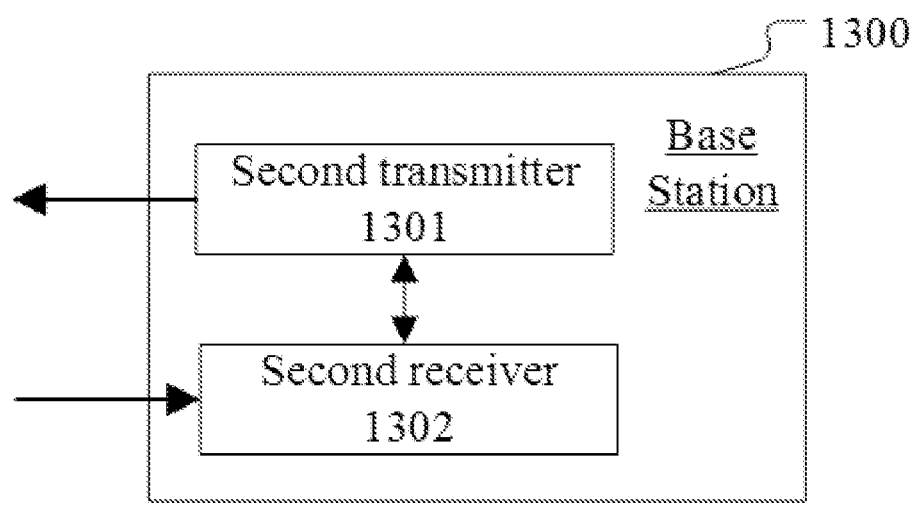
FIG. 16 illustrates a structure block diagram of a processing device in a base station according to one embodiment of the present disclosure.

Embodiment 16 illustrates a structure block diagram of a processing device in a base station, as shown in FIG. 16. In FIG. 16, a processing device 1300 in a base station mainly consists of a second transmitter 1301 and a second receiver 1302.

In one subembodiment of the above embodiment, the second transmitter 1301 comprises a transmitter 416, a transmitting processor 415 and a controller/processor 440 in Embodiment 4.

In one subembodiment of the above embodiment, the second transmitter 1301 comprises at least the former two of a transmitter 416, a transmitting processor 415 and a controller/processor 440 in Embodiment 4.

In one subembodiment of the above embodiment, the second receiver 1303 comprises a receiver 416, a receiving processor 412 and a controller/processor 440 in Embodiment 4.

In one subembodiment of the above embodiment, the second receiver 1303 comprises at least the former two of a receiver 416, a receiving processor 412 and a controller/processor 440 in Embodiment 4.

A second transmitter 1301 transmits first information, the first information is used for indicating K frequency sub-band(s), K is a positive integer;

A second receiver 1302 monitors in a first frequency sub-band whether a first radio signal is transmitted.

In Embodiment 16, the first frequency sub-band comprises frequency domain resources occupied by the first radio signal; a transmitter of the first radio signal performs a first access detection or a second access detection; if the first frequency sub-band belongs to the K frequency sub-band(s) and time domain resources occupied by the first radio signal belong to a first time window, the first access detection is performed, the first access detection is used for determining whether the first radio signal is transmitted in the first frequency sub-band; otherwise, the second access detection is performed, the second access detection is used for determining whether the first radio signal is transmitted in the first frequency sub-band; detection time for the first access detection is less than that for the second access detection.

In one embodiment, the first access detection comprises performing Q energy detection(s) respectively in Q time sub-pool(s) of a first frequency band, and acquiring Q detection value(s), end time of the Q time sub-pool(s) is not later than start time for transmission of the first radio signal; the first frequency band comprises the first frequency sub-band; if each one of Q1 detection value(s) of the Q detection value(s) is lower than a first reference threshold, the first radio signal is transmitted in the first frequency sub-band; otherwise, transmission of the first radio signal is dropped in the first frequency sub-band; Q is a positive integer, Q1 is a positive integer not greater than the Q.

In one embodiment, the second access detection comprises performing P energy detection(s) respectively in P time sub-pool(s) of a second frequency band, and acquiring P detection value(s), end time of the P time sub-pool(s) is not later than start time for transmission of the first radio signal; the second frequency band comprises the first frequency sub-band; if P1 detection value(s) of the P detection value(s) is lower than the first reference threshold, the first radio signal is transmitted in the first frequency sub-band; otherwise, transmission of the first radio signal is dropped in the first frequency sub-band; P is a positive integer, P1 is a positive integer not greater than the P, the P1 is greater than the Q1.

In one embodiment, the second transmitter 1301 further transmits second information; wherein the second information is used for determining at least one of the frequency domain resources occupied by the first radio signal and the time domain resources occupied by the first radio signal.

In one embodiment, M frequency sub-band(s) comprises (comprise) the K frequency sub-band(s), the M frequency sub-band(s) is(are) predefined or configurable, M is a positive integer not less than K.

In one embodiment, the second receiver 1302 further monitors in a second frequency sub-band whether a second radio signal is transmitted; wherein the second frequency sub-band comprises frequency domain resources occupied by the second radio signal, start time for transmission of the first radio signal and that of the second radio signal are the same, the first frequency sub-band and the second frequency sub-band are orthogonal in frequency domain.

In one embodiment, a transmitter of the second radio signal performs a third access detection, or performs a fourth access detection; if the second frequency sub-band belongs to the K frequency sub-band(s) and time domain resources occupied by the second radio signal belong to a second time window, the third access detection is performed, the third access detection is used for determining whether the second radio signal is transmitted in the second frequency sub-band; otherwise, the fourth access detection is performed, the fourth access detection is used for determining whether the second radio signal is transmitted in the second frequency sub-band; detection time for the third access detection is less than that for the fourth access detection.

In one embodiment, the first access detection or the second access detection is further used for determining whether the second radio signal is transmitted in the second frequency sub-band, the first frequency band comprises the first frequency sub-band and the second frequency sub-band, the second frequency band comprises the first frequency sub-band and the second frequency sub-band.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising: receiving first information, wherein:
the first information is used for indicating K frequency sub-band(s) of M frequency sub-bands, K is a positive integer;
the first information belongs to Downlink Control Information (DCI) specific to a terminal group, the UE is a terminal of the terminal group, or the first information belongs to DCI common to a cell;
the first information comprises M bits, the M bits correspond to the M frequency sub-bands respectively; and
a given bit is any bit of the M bits, the given bit being equal to 1 is used for indicating that a frequency sub-band of the M frequency sub-bands corresponding to the given bit belongs to the K frequency sub-bands, the given bit being equal to 0 is used for indicating that a frequency sub-band of the M frequency sub-bands corresponding to the given bit does not belong to the K frequency sub-bands;
receiving second information, the second information belongs to a UE-specific DCI wherein the second information is used for determining at least one of frequency domain resources occupied by a first radio signal and time domain resources occupied by the first radio signal; performing a first access detection, or performing a second access detection; and
transmitting the first radio signal in a first frequency sub-band, or dropping transmission of the first radio signal in a first frequency sub-band; wherein the M frequency sub-bands comprise the K frequency sub-band(s), M is a positive integer not less than the K; the M frequency sub-bands are M sub-bands in a BWP respectively, any two of the M frequency sub-bands are orthogonal in frequency domain; the first frequency sub-band comprises the frequency domain resources occupied by the first radio signal; when the first frequency sub-band belongs to the K frequency sub-band(s) and the time domain resources occupied by the first radio signal belong to a first time window, the first access detection is performed, the first access detection is used for determining whether the first radio signal is transmitted in the first frequency sub-band; the first access detection comprises performing Q energy detection(s) respectively in Q time sub-pool(s) of a first frequency band, and acquiring Q detection value(s), end time of the Q time sub-pool(s) is not later than start time for transmission of the first radio signal; the first frequency band comprises the first frequency sub-band; otherwise, when the first frequency sub-band does not belong to the K frequency sub-band(s) or the time domain resources occupied by the first radio signal do not belong to the first time window, the second access detection is performed, the second access detection is used for determining whether the first radio signal is transmitted in the first frequency sub-band; the second access detection comprises performing P energy detection(s) respectively in P time sub-pool(s) of a second frequency band, and acquiring P detection value(s), end time of the P time sub-pool(s) is not later than start time for transmission of the first radio signal; the second frequency band comprises the first frequency sub-band; and detection time for the first access detection is a sum of time occupied by the Q time sub-pool(s), and detection time for the second access detection is a sum of time occupied by the P time sub-pool(s); the detection time for the first access detection is less than the detection time for the second access detection.

2. The method according to claim 1, wherein when the first access detection is performed, if each one of Q1 detection value(s) of the Q detection value(s) is lower than a first reference threshold, the first radio signal is transmitted in the first frequency sub-band; otherwise, transmission of the first radio signal is dropped in the first frequency sub-band; Q is a positive integer, Q1 is a positive integer not greater than the Q;
when the second access detection is performed, if each one of P1 detection value(s) of the P detection value(s) is lower than the first reference threshold, the first radio signal is transmitted in the first frequency sub-band; otherwise, transmission of the first radio signal is dropped in the first frequency sub-band; P is a positive integer, P1 is a positive integer not greater than the P, the P1 is greater than the Q1.

3. The method according to claim 1, comprising:
transmitting a second radio signal in a second frequency sub-band, or dropping transmission of a second radio signal in a second frequency sub-band;
wherein the second frequency sub-band comprises frequency domain resources occupied by the second radio signal, start time for transmission of the first radio signal and that of the second radio signal are the same, the first frequency sub-band and the second frequency sub-band are orthogonal in frequency domain.

4. The method according to claim 3, wherein the first access detection or the second access detection is further used for determining whether the second radio signal is transmitted in the second frequency sub-band, the first frequency band comprises the first frequency sub-band and the second frequency sub-band, the second frequency band comprises the first frequency sub-band and the second frequency sub-band.

5. A method in a base station for wireless communication, comprising:
  transmitting first information, wherein:
    the first information is used for indicating K frequency sub-band(s) of M frequency sub-bands, K is a positive integer;
    the first information belongs to DCI specific to a terminal group, the UE being a terminal of the terminal group, or the first information belongs to DCI common to a cell;
    the first information comprises M bits, the M bits correspond to the M frequency sub-bands respectively; and
    a given bit is any bit of the M bits, the given bit being equal to 1 is used for indicating that a frequency sub-band of the M frequency sub-bands corresponding to the given bit belongs to the K frequency sub-bands, and the given bit being equal to 0 is used for indicating that a frequency sub-band of the M frequency sub-bands corresponding to the given bit does not belong to the K frequency sub-bands;
  transmitting second information, the second information belonging to a UE-specific DCI, and the second information being used for determining at least one of frequency domain resources occupied by a first radio signal and time domain resources occupied by the first radio signal;
  monitoring in a first frequency sub-band whether a first radio signal is transmitted; wherein:
    the M frequency sub-bands comprise the K frequency sub-band(s), M is a positive integer not less than the K;
    the M frequency sub-bands are M sub-bands in a BWP respectively, any two of the M frequency sub-bands are orthogonal in frequency domain;
    the first frequency sub-band comprises the frequency domain resources occupied by the first radio signal; a transmitter of the first radio signal performs a first access detection or a second access detection; when the first frequency sub-band belongs to the K frequency sub-band(s) and the time domain resources occupied by the first radio signal belong to a first time window, the first access detection is performed, the first access detection is used for determining whether the first radio signal is transmitted in the first frequency sub-band; the first access detection comprises performing Q energy detection(s) respectively in Q time sub-pool(s) of a first frequency band, and acquiring Q detection value(s), end time of the Q time sub-pool(s) is not later than start time for transmission of the first radio signal; the first frequency band comprises the first frequency sub-band; otherwise, when the first frequency sub-band does not belong to the K frequency sub-band(s) or the time domain resources occupied by the first radio signal do not belong to the first time window, the second access detection is performed, the second access detection is used for determining whether the first radio signal is transmitted in the first frequency sub-band; the second access detection comprises performing P energy detection(s) respectively in P time sub-pool(s) of a second frequency band, and acquiring P detection value(s), end time of the P time sub-pool(s) is not later than start time for transmission of the first radio signal; the second frequency band comprises the first frequency sub-band; and
    detection time for the first access detection is a sum of time occupied by the Q time sub-pool(s), and detection time for the second access detection is a sum of time occupied by the P time sub-pool(s); the detection time for the first access detection is less than the detection time for the second access detection.

6. The method according to claim 5, wherein when the first access detection is performed, if each one of Q1 detection value(s) of the Q detection value(s) is lower than a first reference threshold, the first radio signal is transmitted in the first frequency sub-band; otherwise, transmission of the first radio signal is dropped in the first frequency sub-band; Q is a positive integer, Q1 is a positive integer not greater than the Q;
  when the second access detection is performed, if each one of P1 detection value(s) of the P detection value(s) is lower than the first reference threshold, the first radio signal is transmitted in the first frequency sub-band; otherwise, transmission of the first radio signal is dropped in the first frequency sub-band; P is a positive integer, P1 is a positive integer not greater than the P, the P1 is greater than the Q1.

7. The method according to claim 5, comprising:
  monitoring in a second frequency sub-band whether a second radio signal is transmitted;
  wherein the second frequency sub-band comprises frequency domain resources occupied by the second radio signal, start time for transmission of the first radio signal and that of the second radio signal are the same, the first frequency sub-band and the second frequency sub-band are orthogonal in frequency domain.

8. The method according to claim 7, the first access detection or the second access detection is further used for determining whether the second radio signal is transmitted in the second frequency sub-band, the first frequency band comprises the first frequency sub-band and the second frequency sub-band, the second frequency band comprises the first frequency sub-band and the second frequency sub-band.

9. A UE used for wireless communication, comprising:
  a first receiver, receiving first information; receiving second information; performing a first access detection, or performing a second access detection; wherein:
    the first information is used for indicating K frequency sub-band(s) of M frequency sub-bands, K is a positive integer;
    the first information belongs to DCI specific to a terminal group, the UE is a terminal of the terminal group, or the first information belongs to DCI common to a cell;
    the first information comprises M bits, the M bits correspond to the M frequency sub-bands respectively; and
    a given bit is any bit of the M bits, the given bit being equal to 1 is used for indicating that a frequency sub-band of the M frequency sub-bands corresponding to the given bit belongs to the K frequency sub-bands, the given bit being equal to 0 is used for indicating that a frequency sub-band of the M frequency sub-bands corresponding to the given bit does not belong to the K frequency sub-bands;

the second information belongs to a UE-specific DCI, and the second information being used for determining at least one of the frequency domain resources occupied by a first radio signal and the time domain resources occupied by the first radio signal; and a first transmitter, transmitting the first radio signal in a first frequency sub-band, or dropping transmission of the first radio signal in a first frequency sub-band; wherein:

the M frequency sub-bands comprise the K frequency sub-band(s), M is a positive integer not less than the K; the M frequency sub-bands are M sub-bands in a BWP respectively, any two of the M frequency sub-bands are orthogonal in frequency domain;

the first frequency sub-band comprises the frequency domain resources occupied by the first radio signal; when the first frequency sub-band belongs to the K frequency sub-band(s) and the time domain resources occupied by the first radio signal belong to a first time window, the first access detection is performed, the first access detection is used for determining whether the first radio signal is transmitted in the first frequency sub-band; the first access detection comprises performing Q energy detection(s) respectively in Q time sub-pool(s) of a first frequency band, and acquiring Q detection value(s), end time of the Q time sub-pool(s) is not later than start time for transmission of the first radio signal; the first frequency band comprises the first frequency sub-band;

otherwise, when the first frequency sub-band does not belong to the K frequency sub-band(s) or the time domain resources occupied by the first radio signal do not belong to the first time window, the second access detection is performed, the second access detection is used for determining whether the first radio signal is transmitted in the first frequency sub-band; the second access detection comprises performing P energy detection(s) respectively in P time sub-pool(s) of a second frequency band, and acquiring P detection value(s), end time of the P time sub-pool(s) is not later than start time for transmission of the first radio signal; the second frequency band comprises the first frequency sub-band;

detection time for the first access detection is a sum of time occupied by the Q time sub-pool(s), and detection time for the second access detection is a sum of time occupied by the P time sub-pool(s); the detection time for the first access detection is less than the detection time of the second access detection.

10. The UE according to claim 9, wherein when the first access detection is performed, if each one of Q1 detection value(s) of the Q detection value(s) is lower than a first reference threshold, the first radio signal is transmitted in the first frequency sub-band; otherwise, transmission of the first radio signal is dropped in the first frequency sub-band; Q is a positive integer, Q1 is a positive integer not greater than the Q;

when the second access detection is performed, if each one of P1 detection value(s) of the P detection value(s) is lower than the first reference threshold, the first radio signal is transmitted in the first frequency sub-band; otherwise, transmission of the first radio signal is dropped in the first frequency sub-band; P is a positive integer, P1 is a positive integer not greater than the P, the P1 is greater than the Q1.

11. The UE according to claim 9, wherein the first transmitter transmits a second radio signal in a second frequency sub-band, or dropping transmission of a second radio signal in a second frequency sub-band; herein, the second frequency sub-band comprises frequency domain resources occupied by the second radio signal, start time for transmission of the first radio signal and that of the second radio signal are the same, the first frequency sub-band and the second frequency sub-band are orthogonal in frequency domain.

12. The UE according to claim 11, wherein the first access detection or the second access detection is further used for determining whether the second radio signal is transmitted in the second frequency sub-band, the first frequency band comprises the first frequency sub-band and the second frequency sub-band, the second frequency band comprises the first frequency sub-band and the second frequency sub-band.

13. A base station used for wireless communication, comprising:

a second transmitter, transmitting first information; transmits second information; wherein:

the first information is used for indicating K frequency sub-band(s) of M frequency sub-bands, K is a positive integer;

the first information belongs to DCI specific to a terminal group, the UE being a terminal of the terminal group, or the first information belongs to DCI common to a cell;

the first information comprises M bits, the M bits correspond to the M frequency sub-bands respectively; and a given bit is any bit of the M bits, the given bit being equal to 1 is used for indicating that a frequency sub-band of the M frequency sub-bands corresponding to the given bit belongs to the K frequency sub-bands, the given bit being equal to 0 is used for indicating that a frequency sub-band of the M frequency sub-bands corresponding to the given bit does not belong to the K frequency sub-bands;

the second information belonging to a UE-specific DCI, and the second information being used for determining at least one of frequency domain resources occupied by a first radio signal and time domain resources occupied by the first radio signal; and a second receiver, monitoring in a first frequency sub-band whether a first radio signal is transmitted; wherein:

the M frequency sub-bands comprise the K frequency sub-band(s), M is a positive integer not less than the K; the M frequency sub-bands are M sub-bands in a BWP respectively, any two of the M frequency sub-bands are orthogonal in frequency domain;

the first frequency sub-band comprises the frequency domain resources occupied by the first radio signal; a transmitter of the first radio signal performs a first access detection or a second access detection; when the first frequency sub-band belongs to the K frequency sub-band(s) and the time domain resources occupied by the first radio signal belong to a first time window, the first access detection is performed, the first access detection is used for determining whether the first radio signal is transmitted in the first frequency sub-band; the first access detection comprises performing Q energy detection(s) respectively in Q time sub-pool(s) of a first frequency band, and acquiring Q detection value(s), end time of the Q time sub-pool(s) is not later than start time for transmission of the first radio signal; the first frequency band comprises the first frequency sub-band;

otherwise, when the first frequency sub-band does not belong to the K frequency sub-band(s) or the time domain resources occupied by the first radio signal do not belong to the first time window, the second access detection is performed, the second access detection is used for determining whether the first radio signal is transmitted in the first frequency sub-band; the second access detection comprises performing P energy detection(s) respectively in P time sub-pool(s) of a second frequency band, and acquiring P detection value(s), end time of the P time sub-pool(s) is not later than start time for transmission of the first radio signal; the second frequency band comprises the first frequency sub-band; and detection time for the first access detection is a sum of time occupied by the Q time sub-pool(s), and detection time for the second access detection is a sum of time occupied by the P time sub-pool(s); the detection time for the first access detection is less than the detection time for the second access detection.

14. The base station according to claim 13, wherein when the first access detection is performed, if each one of Q1 detection value(s) of the Q detection value(s) is lower than a first reference threshold, the first radio signal is transmitted in the first frequency sub-band; otherwise, transmission of the first radio signal is dropped in the first frequency sub-band; Q is a positive integer, Q1 is a positive integer not greater than the Q;

when the second access detection is performed, if each one of P1 detection value(s) of the P detection value(s) is lower than the first reference threshold, the first radio signal is transmitted in the first frequency sub-band; otherwise, transmission of the first radio signal is dropped in the first frequency sub-band; P is a positive integer, P1 is a positive integer not greater than the P, the P1 is greater than the Q1.

15. The base station according to claim 13, wherein the second receiver monitors in a second frequency sub-band whether a second radio signal is transmitted; herein, the second frequency sub-band comprises frequency domain resources occupied by the second radio signal, start time for transmission of the first radio signal and that of the second radio signal are the same, the first frequency sub-band and the second frequency sub-band are orthogonal in frequency domain.

16. The base station according to claim 15, the first access detection or the second access detection is further used for determining whether the second radio signal is transmitted in the second frequency sub-band, the first frequency band comprises the first frequency sub-band and the second frequency sub-band, the second frequency band comprises the first frequency sub-band and the second frequency sub-band.

* * * * *